US012801666B2

(12) United States Patent
Theagarajan et al.

(10) Patent No.: US 12,801,666 B2
(45) Date of Patent: Nov. 17, 2026

(54) MESSAGE MANAGEMENT USING DIRECTED PROPERTY GRAPHS

(71) Applicant: Infosys Limited, Bangalore (IN)

(72) Inventors: Chitra Theagarajan, Bengaluru (IN); Steven Schilders, Indianapolis, IN (US)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 19/078,673

(22) Filed: Mar. 13, 2025

(65) Prior Publication Data

US 2026/0195383 A1 Jul. 9, 2026

(30) Foreign Application Priority Data

Jan. 6, 2025 (IN) ............................ 202541001271

(51) Int. Cl.
*G06F 16/901* (2019.01)

(52) U.S. Cl.
CPC ................................ *G06F 16/9024* (2019.01)

(58) Field of Classification Search
CPC .. G06F 16/9024; G06F 11/323; G06F 16/211; G06F 16/2453; G06F 16/245; G06F 16/24568; G06F 16/24573
See application file for complete search history.

(56) References Cited

U.S. PATENT DOCUMENTS 11,388,211 B1 * 7/2022 Breeden ............ G06F 16/24568
12,164,569 B2 12/2024 Schilders
12,222,986 B2 2/2025 Schilders
2017/0053294 A1 * 2/2017 Yang .................. G06Q 20/4016
2017/0103165 A1 * 4/2017 Dunlevy ............. G06F 16/9535
2018/0196694 A1 * 7/2018 Banerjee ............. G06F 13/1642
2018/0219888 A1 * 8/2018 Apostolopoulos ........................... H04L 63/1425
2020/0257680 A1 * 8/2020 Danyi ................. G06F 11/3495
2021/0263898 A1 * 8/2021 Lei ...................... G06F 16/9024
2024/0256369 A1 8/2024 Schilders
2024/0256603 A1 8/2024 Schilders
2024/0288841 A1 8/2024 Schilders
2024/0289311 A1 8/2024 Schilders
2024/0289390 A1 8/2024 Schilders
2024/0296185 A1 9/2024 Schilders

* cited by examiner

*Primary Examiner* — Dennis Truong
(74) *Attorney, Agent, or Firm* — Finnegan, Henderson, Farabow, Garrett & Dunner, LLP

(57) ABSTRACT

A system for message management using directed property graphs is provided. A directed property graph is generated using various messages. To generate the graph, for each message, a message node representing the message is instantiated. Each message has various attributes. Some message attributes are associated as node properties of the message node. Further, one or more shared attributes are derived for each message and corresponding attribute nodes are instantiated. One or more attributes are associated as node properties of these attribute nodes. Further, each message node is coupled to a corresponding attribute node by way of an edge. Each edge has edge attributes associated as edge properties. The edge attributes may be derived from node properties of the message node and the corresponding attribute node and may indicate an association therebetween. The generated graph facilitates query response generation.

20 Claims, 12 Drawing Sheets

MESSAGE MANAGEMENT USING DIRECTED PROPERTY GRAPHS

FIELD OF THE DISCLOSURE

Various embodiments of the present disclosure relate generally to directed property graphs. More specifically, various embodiments of the present disclosure relate to message management using directed property graphs.

BACKGROUND

Real-time systems may be utilized in a wide range of applications (e.g., patient monitoring, stock trading, fraud detection, inventory management, or the like) where the execution of a task is time critical. Real-time systems may utilize one or more microservices for the execution of such tasks. A microservice is an independent process that performs a single function within a larger application. Various microservices associated with a real-time system may generate one or more messages and may communicate with each other by way of these messages for task execution. A message may contain data and transactional information. Typically, all the messages generated in the real-time system may be stored in a database (such as a relational database, a non-relational database, a graph database, or the like). The stored messages can be utilized for various use-cases such as real-time analytics, monitoring, alerts, or the like, by way of query processing.

Efficient retrieval of transactional information associated with the messages from the database may play an important role in query processing. Therefore, the structure of the data storage may directly influence the query performance. That is to say, suboptimal data storage structure can lead to significant inefficiencies, such as increased query latency, higher computational costs, higher storage requirements, or the like. Such delays or inefficiencies can hinder time-sensitive tasks and may negatively affect the overall performance. Ultimately, these drawbacks may further degrade the user experience and may increase maintenance overhead.

In light of the foregoing, there exists a need for a technical and reliable solution that overcomes the abovementioned problems.

Limitations and disadvantages of conventional and traditional approaches will become apparent to one of skill in the art, through the comparison of described systems with some aspects of the present disclosure, as set forth in the remainder of the present application and with reference to the drawings.

SUMMARY

Methods and systems for facilitating message management using directed property graphs are provided substantially as shown in, and described in connection with, at least one of the figures.

In an embodiment of the present disclosure, a system is disclosed. The system includes processing circuitry configured to generate a graph based on a plurality of messages. To generate the graph, the processing circuitry is further configured to instantiate a first message node that represents a first message of the plurality of messages. The first message has a first plurality of attributes associated therewith. The processing circuitry is further configured to derive, from the first plurality of attributes, a first set of shared attributes and instantiate a first set of attribute nodes that represents the first set of shared attributes. Further, the processing circuitry is configured to create a set of edges between the first message node and the first set of attribute nodes, with a first edge being created between the first message node and a first attribute node. The processing circuitry is further configured to determine, for the first edge, from the first plurality of attributes, a first set of edge attributes that is indicative of an association between the first message node and the first attribute node, and associate the first set of edge attributes as edge properties of the first edge. The generated graph facilitates query response generation.

In some embodiments, the system further includes a storage element. The processing circuitry is coupled to the storage element, and configured to store the graph in the storage element.

In some embodiments, the first plurality of attributes comprises at least two of a group consisting of an identifier, a correlation identifier, a user identifier, a name, a category, a topic, a key, a scope, an access, a status, an execution, an action, a message type, a created-on timestamp, a raised-on timestamp, a received-on timestamp, a handled-on timestamp, a processed-on timestamp, a publisher identifier, a subscriber identifier, an allow retry, a maximum retry allowed, a retry count, a retry source identifier, a source identifier, or a source type.

In some embodiments, each of the first set of shared attributes is shared with at least one other message of the plurality of messages.

In some embodiments, the first set of shared attributes comprises at least one of a group consisting of an identifier, a correlation identifier, a user identifier, a created-on timestamp, a raised-on timestamp, a received-on timestamp, a handled-on timestamp, or a processed-on timestamp.

In some embodiments, the processing circuitry is further configured to associate at least one of the first plurality of attributes as node properties of the first message node.

In some embodiments, at least one of a group consisting of an identifier, a name, a category, a topic, a key, a scope, an access, a status, an execution, an action, a message type, a created-on timestamp, a raised-on timestamp, a received-on timestamp, a handled-on timestamp, a processed-on timestamp, a publisher identifier, a subscriber identifier, an allow retry, a maximum retry allowed, a retry count, a retry source identifier, a source identifier, or a source type is associated as the node properties of the first message node.

In some embodiments, the processing circuitry is further configured to determine, based on the first plurality of attributes, a set of attributes for the first attribute node. The set of attributes is linked with a shared attribute, of the first set of shared attributes, represented by the first attribute node. The processing circuitry is further configured to associate the determined set of attributes as node properties of the first attribute node.

In some embodiments, the first set of edge attributes of the first edge comprises at least one attribute associated as node properties of the first message node and at least one of the determined set of attributes.

In some embodiments, to generate the graph, the processing circuitry is further configured to instantiate a second message node that represents a second message of the plurality of messages. The second message has a second plurality of attributes associated therewith. A response to the query is generated based on at least one of a group consisting of the first message node, node properties of the first message node, the first set of attribute nodes, the set of edges, the edge properties of the first edge, the second message node, or node properties of the second message node.

In some embodiments, the processing circuitry is further configured to associate at least one of the first plurality of attributes as the node properties of the first message node and at least one of the second plurality of attributes as the node properties of the second message node.

In some embodiments, to generate the graph, the processing circuitry is further configured to create a second edge between the second message node and the first message node, determine, for the second edge, a second set of edge attributes that is indicative of an association between the second message node and the first message node, and associate the second set of edge attributes as edge properties of the second edge.

In some embodiments, the first message is correlated with the second message such that the first message has a causal association with the second message, and as a result, the first message node representing the first message has a causal association with the second message node representing the second message. The second edge is indicative of the causal association between the second message node and the first message node.

In some embodiments, the second set of edge attributes comprises at least one attribute associated as the node properties of the first message node and at least one attribute associated as the node properties of the second message node.

In some embodiments, the response to the query is generated further based on at least one of a group consisting of the second edge and the edge properties of the second edge.

In some embodiments, to generate the graph, the processing circuitry is further configured to create a third edge between the second message node and the first attribute node, determine, for the third edge, a third set of edge attributes that is indicative of an association between the second message node and the first attribute node, and associate the third set of edge attributes as edge properties of the third edge.

In some embodiments, the processing circuitry is further configured to determine, based on the first plurality of attributes, a set of attributes for the first attribute node, and associate the determined set of attributes as node properties of the first attribute node. The determined set of attributes is linked with a shared attribute, of the first set of shared attributes, represented by the first attribute node. The third set of edge attributes comprises at least one of the determined set of attributes and at least one attribute associated as the node properties of the second message node.

In some embodiments, the response to the query is generated further based on at least one of a group consisting of the determined set of attributes, the third edge, or the edge properties of the third edge.

In some embodiments, to generate the graph, the processing circuitry is further configured to derive, from the second plurality of attributes, a second set of shared attributes, instantiate a second set of attribute nodes that represents the second set of shared attributes, create a fourth edge between the first attribute node and a second attribute node of the second set of attribute nodes, determine, for the fourth edge, a fourth set of edge attributes that is indicative of an association between the first attribute node and the second attribute node, and associate the fourth set of edge attributes as edge properties of the fourth edge.

In some embodiments, the processing circuitry is further configured to determine, based on the first plurality of attributes, a first set of attributes for the first attribute node and associate the first set of attributes as node properties of the first attribute node. The processing circuitry is further configured to determine, based on the second plurality of attributes, a second set of attributes for the second attribute node and associate the second set of attributes as node properties of the second attribute node. The first set of attributes is linked with a first shared attribute, of the first set of shared attributes, represented by the first attribute node, and the second set of attributes is linked with a second shared attribute, of the second set of shared attributes, represented by the second attribute node. The fourth set of edge attributes comprises at least one of the first set of attributes and at least one of the second set of attributes.

In some embodiments, the response to the query is generated further based on at least one of a group consisting of the second set of attribute nodes, the fourth edge, or the edge properties of the fourth edge.

In some embodiments, the second message is generated based on a processing of the first message.

In some embodiments, to generate the graph, the processing circuitry is further configured to instantiate a first entity node associated with the first message node, create a fifth edge between the first message node and the first entity node, determine, for the fifth edge, a fifth set of edge attributes that is indicative of an association between the first message node and the first entity node, and associate the fifth set of edge attributes as edge properties of the fifth edge.

In some embodiments, the processing circuitry is further configured to determine a set of entity attributes for the first entity node and associate the set of entity attributes as node properties of the first entity node. The fifth set of edge attributes comprises at least one of the set of entity attributes and at least one attribute associated as node properties of the first message node.

In some embodiments, a response to the query is generated based on at least one of a group consisting of the first entity node, the fifth edge, or the edge properties of the fifth edge.

In some embodiments, to generate the graph, the processing circuitry is further configured to instantiate a second message node that represents a second message of the plurality of messages, instantiate a second entity node associated with the second message node, create a sixth edge between the second message node and the second entity node, determine, for the sixth edge, a sixth set of edge attributes that is indicative of an association between the second message node and the second entity node, and associate the sixth set of edge attributes as edge properties of the sixth edge. The processing circuitry is further configured to create a seventh edge between the second entity node and the first entity node, determine, for the seventh edge, a seventh set of edge attributes that is indicative of an association between the second entity node and the first entity node, and associate the seventh set of edge attributes as edge properties of the seventh edge.

In some embodiments, the processing circuitry is further configured to determine a first set of entity attributes for the first entity node and a second set of entity attributes for the second entity node, and associate the first set of entity attributes as node properties of the first entity node and the second set of entity attributes as node properties of the second entity node. The sixth set of edge attributes comprises at least one of the second set of entity attributes and at least one attribute associated as node properties of the second message node. The seventh set of edge attributes comprises at least one of the first set of entity attributes and at least one of the second set of entity attributes.

In some embodiments, a response to the query is generated based on at least one of a group consisting of the second message node, the second entity node, the sixth edge, the edge properties of the sixth edge, the seventh edge, or the edge properties of the seventh edge.

In some embodiments, the second entity node corresponds to a next version of the first entity node.

In some embodiments, to generate the graph, the processing circuitry is further configured to instantiate a second message node that represents a second message of the plurality of messages, create an eighth edge between the second message node and the first entity node, and determine, for the eighth edge, an eighth set of edge attributes that is indicative of an association between the second message node and the first entity node. The eighth set of edge attributes comprises at least one attribute associated as node properties of the second message node and at least one of a set of entity attributes of the first entity node. The processing circuitry is further configured to associate the eighth set of edge attributes as edge properties of the eighth edge.

In some embodiments, to generate the graph, the processing circuitry is further configured to create a ninth edge between the first entity node and the first attribute node, determine, for the ninth edge, a ninth set of edge attributes that is indicative of an association between the first entity node and the first attribute node, and associate the ninth set of edge attributes as edge properties of the ninth edge.

In some embodiments, the processing circuitry is further configured to determine a set of entity attributes for the first entity node and associate the set of entity attributes as node properties of the first entity node. The processing circuitry is further configured to determine a set of attributes for the first attribute node and associate the set of attributes as node properties of the first attribute node. The ninth set of edge attributes comprises at least one of the set of entity attributes and at least one of the set of attributes of the first attribute node.

In some embodiments, a response to the query is generated based on at least one of a group consisting of the ninth edge or the edge properties of the ninth edge.

In some embodiments, the first message corresponds to at least one of a group consisting of a command, a query, and an event.

In some embodiments, the first edge couples the first message node to the first attribute node by way of an out-role and an in-role, with the out-role defining an origin of the corresponding edge and the in-role defining a destination of the corresponding edge.

In some embodiments, the processing circuitry is further configured to receive the query that comprises a reference value, identify, in the graph, at least one attribute node having a data value that is associated with the reference value, identify one or more edges associated with the identified attribute node, and generate a response to the query based on the identified attribute node and the identified one or more edges.

In some embodiments, the processing circuitry is further configured to identify one or more nodes linked to the identified one or more edges, respectively. An identified node, of the identified one or more nodes, corresponds to one of a group consisting of a message node and an attribute node. The response is generated further based on the identified one or more nodes.

In some embodiments, the processing circuitry is further configured to receive the query that comprises a reference value, identify, in the graph, at least one edge having an edge property that is associated with the reference value, and generate a response to the query based on the identified at least one edge.

In some embodiments, the graph corresponds to a directed property graph.

In some embodiments, a method is disclosed. The method comprises generating, by processing circuitry, a graph based on a plurality of messages. The step of generating the graph further comprises instantiating, by the processing circuitry, a first message node that represents a first message of the plurality of messages. The first message has a first plurality of attributes associated therewith. The step of generating the graph further comprises deriving, by the processing circuitry, from the first plurality of attributes, a first set of shared attributes, and instantiating, by the processing circuitry, a first set of attribute nodes that represents the first set of shared attributes. Further, the step of generating the graph comprises creating, by the processing circuitry, a set of edges between the first message node and the first set of attribute nodes, with a first edge being created between the first message node and a first attribute node. The step of generating the graph further comprises determining, by the processing circuitry, for the first edge, from the first plurality of attributes, a first set of edge attributes that is indicative of an association between the first message node and the first attribute node, and associating, by the processing circuitry, the first set of edge attributes as edge properties of the first edge. The generated graph facilitates query response generation.

BRIEF DESCRIPTION OF THE DRAWINGS

Embodiments of the present disclosure are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

Figure 1:
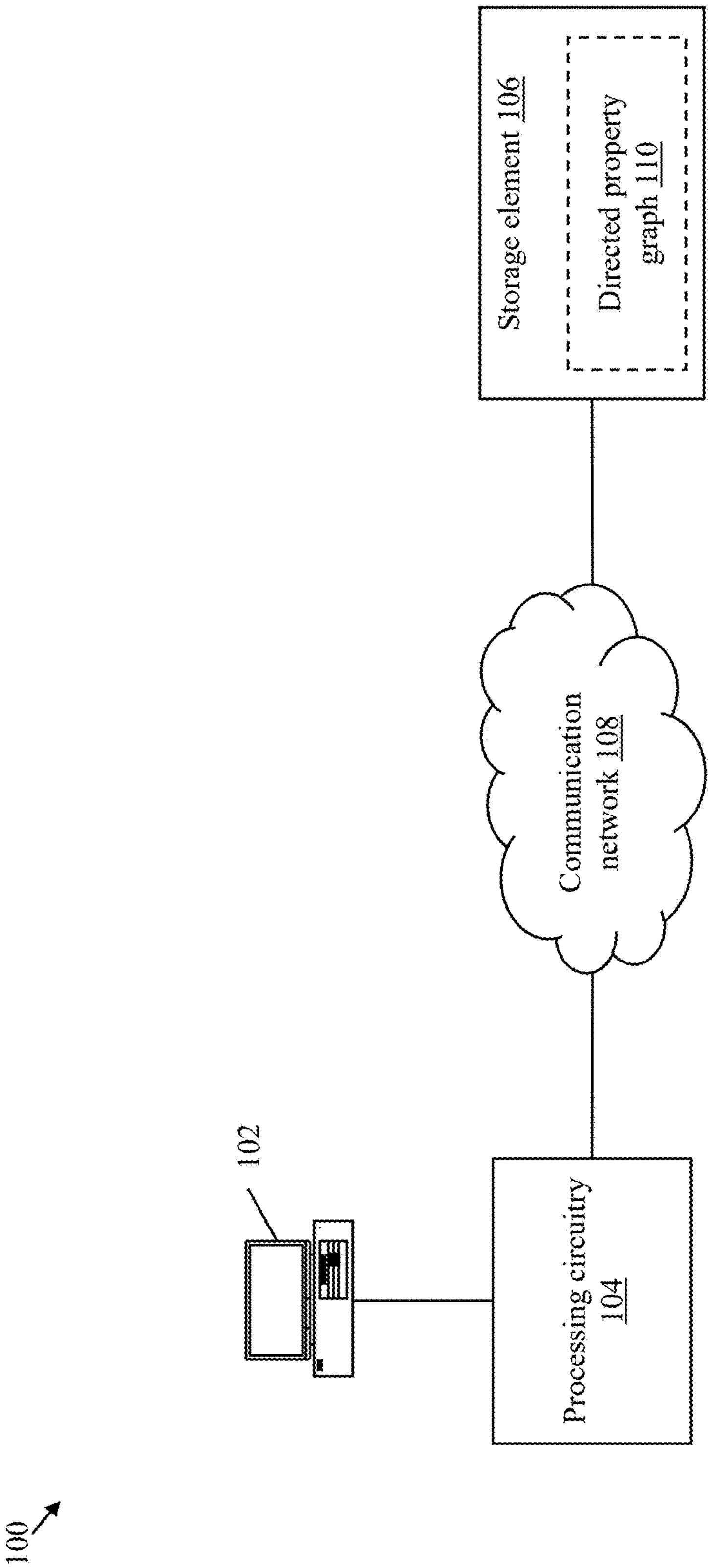
FIG. 1 is a block diagram that illustrates a system environment for message management using directed property graphs, consistent with disclosed embodiments of the present disclosure.

The detailed description of the appended drawings is intended as a description of the embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Overview:

Conventionally, messages generated in a real-time system may be stored in a directed property graph to facilitate data search operations. In the directed property graph, the message may be stored as a message node, with two message nodes being coupled by way of an edge indicating an association therebetween. Each message may have various attributes, such as an identifier (ID), a correlation ID, a category, a topic, a name, or the like. Various attributes form the transactional information that is required to be communicated from one microservice to another for an end-to-end task execution.

Traditionally, the attributes may be associated as node properties of the message node. In such a scenario, to execute a query (e.g., a data search), each node property of each message node may be required to be searched. This search may be inefficient and time-consuming as the directed property graph may have millions of message nodes. Such query processing may cause delays which may prove fatal in time-critical tasks. An alternative implementation may include storing attributes as attribute value nodes and coupling them to the message node via edges. In such a scenario, while the query processing may be less intensive as compared to the previous approach, instantiating a value node for each attribute of each message may be costly in terms of memory utilization. Therefore, the conventional approach of association of attributes with the message node may prove to be inadequate in fulfilling the current requirement of fast and efficient query processing for real-time tasks.

The present disclosure provides a unique approach to the directed property graph implementation that leads to optimized query processing. The present disclosure discloses a graph (e.g., a directed property graph) generated using various messages associated with a real-time system. For each message, a message node may be instantiated in the graph. At least one attribute of a message may be associated as node properties of the corresponding message node. Further, attributes of the message that are shared with other messages may be determined and instantiated as attribute nodes in the graph. Edges may be created between the message node and the attribute nodes, with each edge indicating an association between the message node and the corresponding attribute node. Further, one or more attributes of the message may be associated as edge properties of the edge. The one or more attributes selected for the association as the edge properties may indicate the association between the message node and the corresponding attribute node. Additionally, some attributes may be associated as node properties of each attribute node.

Such a graph structure ensures that exclusively the essential attributes are represented as attribute nodes in the graph. In such a graph, the query processing may start from an attribute node or an edge. In both cases, the node properties of the attribute node and/or the edge properties of the edge can be utilized to generate a response to the query. In some scenarios, the response may be generated without having to traverse to the message node. Therefore, additional database lookups of searching each message node in the graph may be preserved. It is appreciated that the human mind is not equipped to conceptualize an optimized association of attributes with a corresponding message node in the directed property graph, given the digital interconnectedness of the association.

The present disclosure provides numerous advantages including optimized and organized association of attributes with a corresponding message node. Additionally, storing only the required attributes as attribute nodes may further result in optimized memory utilization. Notably, the excessive database lookups may be prevented which may further lead to fast query processing with significant ease and reduced time consumption.

Figure Description:

FIG. 1 is a block diagram that illustrates a system environment 100 for message management using directed property graphs, consistent with disclosed embodiments of the present disclosure. In today's fast-paced world, real-world problems (e.g., fraud detection, healthcare, traffic congestion, or the like) require real-time analytics for quick and efficient decision-making. Such an approach may require optimization at every stage of problem-solving. A problem may be solved by gaining real-time analytics and making decisions thereupon. The data required for performing the analytics is typically stored in databases. Hence, for real-time analytics, a database look-up is required to retrieve the data efficiently. A database look-up may involve retrieving data from a database by querying the database. In real-time analytics, where data is constantly collected and analyzed, excessive database lookups may impose various inefficiencies, such as slow query processing, delayed analytics, degraded user experience, or the like. Therefore, reduced database lookups with efficient query processing may be required to optimize the solution.

Typically, a real-world problem may be distributed across different services, with each component of the problem being handled by a specific service. These services may be referred to as microservices. A microservice may be specifically designed to execute a particular task. Upon execution of the task, the microservice may generate a message that may include transactional information associated with the task. These messages may be stored in a database for various purposes. For example, real-time analytics for decision-making may be performed on the messages stored in the databases. In this scenario, the decision-making may inherently depend on the efficient retrieval of transactional information associated with the messages. The efficient retrieval may depend on how the transactional information is stored in the database. Therefore, the determination of the data storage structure may be important for real-time analytics and decision-making.

Traditionally, the transactional information may be stored in directed property graphs. A directed property graph is a graph data model consisting of nodes, edges, and properties, where edges have direction and both nodes and edges can store key-value pairs, allowing for complex data representation and efficient querying. The entire transactional information may be stored in directed property graphs as node properties or as value nodes. In the first scenario, the query processing may be inefficient and time-consuming, whereas the second scenario may be costly in terms of memory utilization. Therefore, the traditional approaches may be inadequate in fulfilling the current requirement of fast and efficient query processing for real-time tasks.

The present disclosure provides a solution to implement faster query processing and efficient real-time analysis by storing messages in directed property graphs, with exclusively the relevant part of the transactional information being stored as nodes in directed property graphs. Referring to FIG. 1, the system environment 100 may include a real-time system 102, processing circuitry 104, a storage element 106, and a communication network 108. The processing circuitry 104 may be configured to access the storage element 106 via the communication network 108.

The real-time system 102 may represent a distributed platform that encompasses various microservices for the resolution of real-world problems. Each microservice handling a particular task associated therewith may generate/publish a message at the end of the task execution. The published message may correspond to an output of the microservice. Other microservices associated with the real-time system 102 may further subscribe to and process the published message. Thus, one or more microservices may communicate with each other by way of messages.

The processing circuitry 104 may include suitable logic, circuitry, interfaces, and/or code, executable by the circuitry, that may be configured to perform optimized query processing. The processing circuitry 104 may be configured to generate (e.g., derive) a directed property graph 110 based on the messages associated with the real-time system 102, and store the directed property graph 110 in the storage element 106. Examples of the storage element 106 may include, but are not limited to, a random-access memory (RAM), a read-only memory (ROM), a removable storage drive, a hard disk drive (HDD), a flash memory, a solid-state memory, or the like.

Each message may be associated with various attributes that may correspond to transactional information associated with the real-time system 102. The transactional information may define the composition of the message. Various attributes associated with the message may correspond to an identifier (ID), a correlation ID, a user ID, a name, a category, a topic, a key, a scope, an access, a status, an execution, an action, a message type, a created-on timestamp, a raised-on timestamp, a received-on timestamp, a handled-on timestamp, a processed-on timestamp, a publisher ID, a subscriber ID, an allow retry, a maximum retry allowed, a retry count, a retry source ID, a source ID, and a source type. The composition of the message is described in detail in conjunction with FIG. 2.

Generation of the Directed Property Graph 110:

To generate the directed property graph 110, the processing circuitry 104 may execute various operations. For example, the processing circuitry 104 may be configured to instantiate a message node for each unique message associated with the real-time system 102.

Each message may have a plurality of attributes associated therewith. Examples of these attributes may include an ID, a correlation ID, a user ID, a name, a category, a topic, a key, a scope, an access, a status, an execution, an action, a message type, a created-on timestamp, a raised-on timestamp, a received-on timestamp, a handled-on timestamp, a processed-on timestamp, a publisher ID, a subscriber ID, an allow retry, a maximum retry allowed, a retry count, a retry source ID, a source ID, a source type, or the like. The processing circuitry 104 may be further configured to associate some of the attributes as node properties of each message node. Examples of such attributes may include the ID, the name, the category, the topic, the key, the scope, the access, the status, the execution, the action, the message type, the created-on timestamp, the raised-on timestamp, the received-on timestamp, the handled-on timestamp, the processed-on timestamp, the publisher ID, the subscriber ID, the allow retry, the maximum retry allowed, the retry count, the retry source ID, the source ID, the source type, or the like.

Some attributes of a message may be shared with at least one other message of the real-time system 102. For example, two or more messages may have a causal association therebetween and in such cases, may share data values of one or more attributes. To generate the directed property graph 110, the processing circuitry 104 may be further configured to derive one or more shared attributes of each message, and instantiate one or more attribute nodes that may represent the one or more shared attributes, respectively. Examples of the shared attribute may include the ID, the correlation ID, the user ID, the created-on timestamp, the raised-on timestamp, the received-on timestamp, the handled-on timestamp, the processed-on timestamp, or the like. In the present disclosure, the sharing of an attribute corresponds to the sharing of a unique data value. For example, an ID of a message may correspond to a source ID of another message. In such a scenario, the ID (e.g., the data value of the ID attribute) is the shared attribute.

The processing circuitry 104 may be further configured to create one or more edges between the message node and the one or more attribute nodes, respectively. Further, for each edge, the processing circuitry 104 may be configured to determine one or more edge attributes that may be indicative of an association between the message node and the corresponding attribute node, and associate the determined edge attributes as edge properties of the corresponding edge. Additionally, for each attribute node, the processing circuitry 104 may be configured to determine a set of attributes and associate the determined set of attributes as node properties of the corresponding attribute node. For each attribute node, the determined set of attributes may be linked with a shared attribute represented by the corresponding attribute node. The processing circuitry 104 may be further configured to create edges between two message nodes. For each edge, the processing circuitry 104 may be further configured to determine edge attributes that may be indicative of an association between the two message nodes and associate the determined edge attributes as edge properties of the corresponding edge. The aforementioned operations may be executed for all messages associated with the real-time system 102. The directed property graph 110 may thus be generated using the messages associated with the real-time system 102. Further, such a graph generation may result in one or more attribute nodes being associated with two or more message nodes. Thus, the directed property graph 110 may indicate various associations and relationships between the messages. Such a structure of the directed property graph 110 may facilitate optimized query processing. The structure of the directed property graph 110 is explained in detail in conjunction with FIGS. 3-8.

In an embodiment, the processing circuitry 104 may receive a query. The query may pertain to a search to be executed on the messages stored in the directed property graph 110. The query may include a reference value. The processing circuitry 104 may be configured to identify, in the directed property graph 110, an attribute node having a data value that is associated with (e.g., is identical to) the reference value included in the query. The processing circuitry 104 may be further configured to identify one or more edges associated with the identified attribute node. In such a scenario, the processing circuitry 104 may be further configured to generate a response to the query based on the identified attribute node, the identified edges, the node properties of the identified attribute node, and the edge properties of the identified edges. In some embodiments, the processing circuitry 104 may be further configured to identify one or more nodes linked to the identified edges. Each identified node may correspond to a message node or an attribute node. In such cases, the response may be generated further based on such nodes.

The scope of the present disclosure is not limited to the query processing described above. In another embodiment, the processing circuitry 104 may be configured to identify, in the directed property graph 110, an edge having an edge property that is associated with the reference value included in the query. The processing circuitry 104 may be further configured to generate the response to the query based on the edge properties of the identified edge.

Thus, to create the directed property graph 110, relationships between messages are analyzed based on the data values of the attributes shared therebetween. Associations of such attributes as attribute nodes allow faster query processing as the correlated one or more message nodes may be identified by identifying the shared attribute node. Further, the association of other attributes as node properties prevents unnecessary database lookups as well allows efficient memory utilization. Relationships between one or more messages may be further analyzed based on the edge properties associated with each edge. Therefore, traversing to each message node for query processing can effectively be avoided by analyzing the optimized relationships and generating a streamlined structure associated with the directed property graph 110 for efficient query processing.

The processing circuitry 104 may be implemented by one or more processors, such as, but not limited to, an application-specific integrated circuit (ASIC) processor, a reduced instruction set computer (RISC) processor, a complex instruction set computer (CISC) processor, and a field programmable gate array (FPGA) processor. The one or more processors may also correspond to central processing units (CPUs), graphics processing units (GPUs), neural processing units (NPUs), digital signal processors (DSPs), or the like. It will be apparent to a person of ordinary skill in the art that the processing circuitry 104 may be compatible with multiple operating systems. The processing circuitry 104 may further include one or more components (for example, a parser, a loader, or the like) that may be configured to execute one or more operations to be executed by the processing circuitry 104.

The communication network 108 is a medium through which instructions and data are transmitted between the processing circuitry 104 and the storage element 106. Examples of the communication network 108 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, microwave communication, and a combination thereof. Examples of the communication network 108 may further include a Narrow Band-Internet of Things (NB-IoT) network, a 5G network, a 4G network, a long-range (LoRa) wireless technology network, a ZigBee network, an IPv6 Low-power Wireless Personal Area Network (6LowPAN), or the like. Various entities (such as the processing circuitry 104 and the storage element 106) in the system environment 100 may be coupled to the communication network 108 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Although the present disclosure describes the generation and utilization of a directed property graph (e.g., the directed property graph 110), the scope of the present disclosure is not limited to it. In numerous embodiments, other types of graphs, such as undirected graphs, weighted graphs, bipartite graphs, or the like, may be utilized without deviating from the scope of the present disclosure.

The scope of the present disclosure is not limited to a standalone realization of the storage element 106, as described herein. In numerous embodiments, the storage element 106 can be realized in the form of a database server or a cloud storage working in conjunction with the processing circuitry 104, without departing from the scope of the present disclosure.

Figure 2:
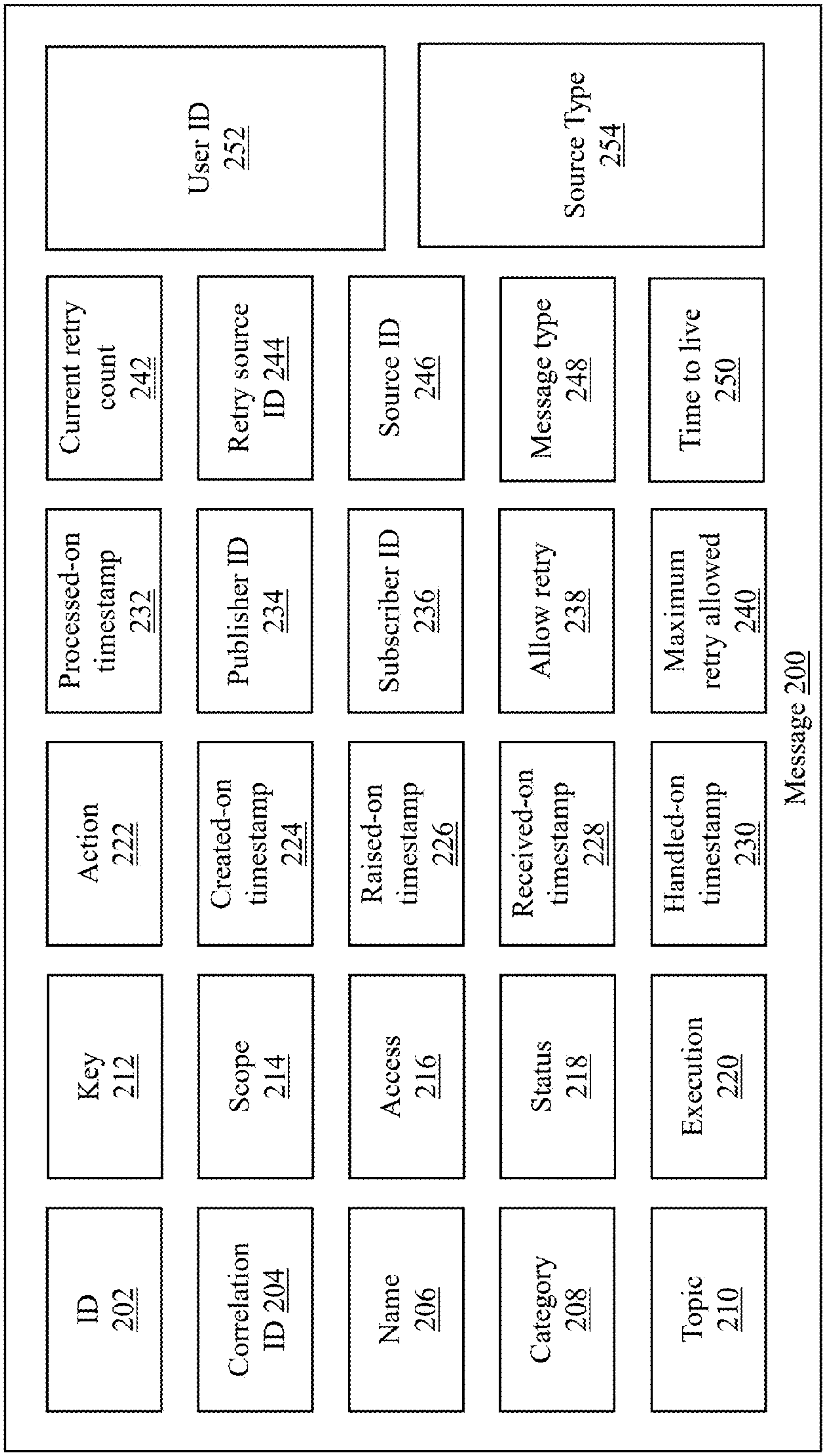
FIG. 2 is a block diagram that illustrates composition of a message, consistent with disclosed embodiments of the present disclosure.

FIG. 2 is a block diagram that illustrates composition of a message 200, consistent with disclosed embodiments of the present disclosure. The message 200 may correspond to one of a command-type message, a query-type message, or an event-type message. The message 200 may be associated with the real-time system 102. The message 200 may include data and transactional information. Data included in the composition of the message 200 may refer to the message payload. In other words, the data in the composition of the message 200 refers to a statement, an instruction, a message, a command, a query, or the like, that is being communicated via the message 200.

Referring to FIG. 2, the composition of the message 200 includes a plurality of attributes that form the transactional information associated with the message 200. The plurality of attributes may include an ID 202, a correlation ID 204, a name 206, a category 208, a topic 210, a key 212, a scope 214, an access 216, a status 218, an execution 220, an action 222, a created-on timestamp 224, a raised-on timestamp 226, a received-on timestamp 228, a handled-on timestamp 230, a processed-on timestamp 232, a publisher ID 234, a subscriber ID 236, an allow retry 238, a maximum retry allowed 240, a current retry count 242, a retry source ID 244, a source ID 246, a message type 248, a time to live 250, a user ID 252, and a source type 254. Though the data associated with the message 200 is not shown in FIG. 2, it will be apparent to a person skilled in the art that the composition of the message 200 includes the data to be communicated by the message 200.

The ID 202 is a unique ID associated with the message 200 and may be used by the processing circuitry 104 to identify the message 200.

The correlation ID 204 is an ID that is shared among messages that are related. The correlation ID 204 may be used to join and correlate one or more messages in a transaction flow such as a command-to-event, a query-to-event, or the like. Each sub-message (e.g., child message) of a compound message (e.g., parent message) may include a hierarchical correlation ID. Further, sub-messages at the same level of hierarchy may have identical data values for the correlation ID 204. Sub-messages at each subsequent hierarchical level may further include data values of the correlation ID 204 of sub-messages at previous hierarchical levels. Each sub-message may also include a root ID that is associated with the parent message.

The name 206 is a human-understandable descriptor of the message 200 and is solely included for the ease of understanding of users associated with the real-time system 102.

The category 208 is a human-understandable descriptor of a domain or criterion of the message. For example, a data value of the category 208 of the message 200 may be an order management message.

The topic 210 is a human-understandable descriptor of a topic/domain/subject/agenda associated with which the message 200 has been published. Notably, the topic 210 allows the grouping of multiple messages irrespective of their category. Each message may be associated with a single data value of the topic 210. Notably, multiple messages may be associated with the same data value of the topic 210. Each data value of the topic 210 may have one or more subscribers (for example, one or more microservices). The subscriber may handle the message 200 associated with a topic. Each data value of the topic 210 may be published/scheduled for processing using a specific pipeline of a messaging bus (shown in FIG. 10).

The key 212 corresponds to a unique ID associated with a root data node for which the message 200 may be created. The root data node may be further processed by one or more messages, each representing a different transaction. In such a case, the data value for the key attribute of the one or more messages may be identical to the data value of the key 212 associated with the message 200. The identical data value of the key associated with the one or more messages may allow to maintain an order of the one or more messages in a message queue within the topic 210 based on the processing of the one or more messages on the root data node. Further, the key 212 is used to establish a single partition in the message queue of a messaging system (for example, Kafka) such that the one or more messages may be stored and consumed in the exact order they were produced. In an embodiment, if the root data node is processed by two different transactions, i.e., by two different messages, the processing order of the two messages may be maintained for one or more handler microservices that may subscribe to these messages. Utilization of the key 212 allows the sending of these messages to the same partition so that the one or more handler microservices may subscribe to these messages from the same partition.

The scope 214 ensures appropriate security of the message 200. Data values of the scope 214 may be internal or external. When the data value of the scope 214 is internal, the message 200 may be internal, e.g., the message 200 may be communicated between one or more microservices associated with a host system. Alternatively, when the data value of the scope 214 is external, the message 200 may be external, e.g., the message 200 may be communicated between a microservice associated with a native system and different microservices associated with an external system. Therefore, the data value of the scope 214 may be one of internal, external, or internal and external.

The access 216 determines access permission to the message 200. In an instance, when a data value of the access 216 is public, a user trying to access the message 200 is not required to be authenticated prior to the access. In another instance, when the data value of the access 216 is private, a user trying to access the message 200 is required to be authenticated prior to accessing the message 200.

The status 218 is indicative of the progress of execution of the message 200. A data value of the status 218 of the message 200 may be one of created, raised, received, handled, or processed.

The execution 220 is indicative of a path that is to be traveled by the message 200 to reach its destination node. The data value of the execution 220 may be synchronous or asynchronous. In an instance, when the data value of the execution 220 is asynchronous, the message 200 may follow a transaction path that is loosely coupled. That is to say, the message 200 generated by a producer microservice may be communicated to a consumer microservice by way of a message-oriented middleware, such as Kafka, RabbitMQ, or the like. In another instance, when the data value of the execution 220 is synchronous, the message 200 may follow a transaction path that is not loosely coupled. For example, in the case of an application using a messaging mechanism, a built-in application programming interface (API) may be utilized that may allow communication of the message 200 within the application without relying on an external message-oriented middleware.

The action 222 is indicative of an action or operation to be performed by a microservice that subscribes to the message 200.

The created-on timestamp 224 includes details (such as time, date, day, month, or the like) regarding the creation of the message 200 by its source microservice.

The raised-on timestamp 226 includes details (such as time, date, day, month, or the like) regarding the publication of the message 200 on a communication bus by its source microservice. The communication bus forms a channel between a source microservice and a destination microservice of the message.

The received-on timestamp 228 includes details (such as time, date, day, month, or the like) regarding when the message 200 is received by the destination microservice but has not been processed.

The handled-on timestamp 230 includes details (such as time, date, day, month, or the like) associated with a point in time when the processing of the message 200 is initiated.

The processed-on timestamp 232 includes details (such as time, date, day, month, or the like) regarding when the processing of the message 200 gets completed.

The publisher ID 234 is a unique ID for a publisher microservice that has published the message 200. A data value of the publisher ID 234 may be associated with the source microservice or an intermediate microservice.

The subscriber ID 236 is a unique ID for a handler microservice(s) that subscribes to the message 200. Notably, a command-type message and a query-type message may be subscribed to by a single microservice, whereas an event-type message may be subscribed to by multiple microservices and each microservice may receive a copy of the event-type message.

The allow retry 238 ensures successful communication and processing of the message 200. A data value of the allow retry 238 determines if the message 200 is to be re-published in case the status of the message 200 is a failure or partial failure. The re-published message may be a clone of the original message 200.

The maximum retry allowed 240 determines the maximum count for which the message 200 is to be re-published in case the status of the message 200 is a failure or partial failure.

The current retry count 242 keeps track of a number of times for which the message 200 is re-published. That is to say that the current retry count 242 is indicative of a current count of re-publications of the message 200. The data value of the current retry count 242 gets incremented with each re-publication of the message 200.

The retry source ID 244 included in the message 200 is a unique ID of an original message that is being re-published. The retry source ID 244 is required as a clone message with a different ID is generated and published during the re-publication of the message 200. The clone message has timestamps (e.g., created-on timestamp, received-on timestamp, or the like) that are different from the timestamps included in the message 200. Therefore, to link the clone message to the message 200, a data value of the retry source ID 244 is included in the clone message.

The source ID 246 represents an object that initiated the message creation. For example, if a user experience (UX) initiates a transaction, the data value of the source ID 246 may correspond to the data value of an ID of the UX control/page. In another embodiment, the source ID 246 is included in the message 200 if the message 200 has originated from another message. For example, an event-type message that is created in response to the processing of a command-type message may have a data value of the source ID 246 that is identical to the data value of the ID 202 of the command-type message.

The message type 248 is indicative of the message 200 being one of a command message, a query message, or an event message. The message type 248 may further include a flag, where a value '1' of the flag may indicate that the message represented by the message 200 is a leaf message, whereas a value '0' of the flag may indicate that the message 200 is a composite message. The leaf message does not have any sub-messages, whereas the composite message is a message having one or more sub-messages. In other embodiments, composite and leaf messages may be indicated differently without deviating from the scope of the disclosure.

The time to live 250 may be indicative of a time period during which the message 200 may be valid. Therefore, the message should be communicated and processed within a duration that is indicated by a data value of the time to live 250. In an instance of failure or partial failure, the message 200 should not be re-published once the time period indicated by the data value of the time to live 250 has lapsed. Notably, the lapse of the time period indicated by the data value of the time to live 250 is indicative of message 200 being invalid.

The user ID 252 has a corresponding data value that is a unique ID associated with a user of the real-time system 102 that may have generated the message 200.

The source type 254 refers to a source that may have caused the generation of the message 200. In an embodiment, a data value of the source type 254 may be one of command, query, and event. In another embodiment, the data value of the source type 254 may be a non-message type.

The composition of the message 200 described in FIG. 2 may be used by the processing circuitry 104 for performing the analysis of the message. Such analysis may be performed to determine one or more analytical insights related to the performance of the business solution associated with the real-time system 102.

The plurality of attributes associated with the message 200 may include one or more attributes that comprise static information and one or more attributes that comprise dynamic information. The static information may be assigned to the one or more attributes at the time of the creation of the message 200, whereas the dynamic information may be assigned to the one or more attributes during the processing of the message 200. The one or more attributes with static information may correspond to ID 202, the correlation ID 204, the name 206, the category 208, the topic 210, the key 212, the scope 214, the access 216, the execution 220, the action 222, the allow retry 238, the maximum retry allowed 240, the retry source ID 244, the source ID 246, the source type 254, and the user ID 252. Further, the one or more attributes with dynamic information may correspond to the status 218, the created-on timestamp 224, the raised-on timestamp 226, the received-on timestamp 228, the handled-on timestamp 230, the processed-on timestamp 232, the publisher ID 234, the subscriber ID 236, and the current retry count 242.

It will be apparent to a person skilled in the art that the composition of the message 200 described in conjunction with FIG. 2 is non-limiting, and in other embodiments, components included in the message 200 may differ from the components depicted in FIG. 2.

Figure 3:
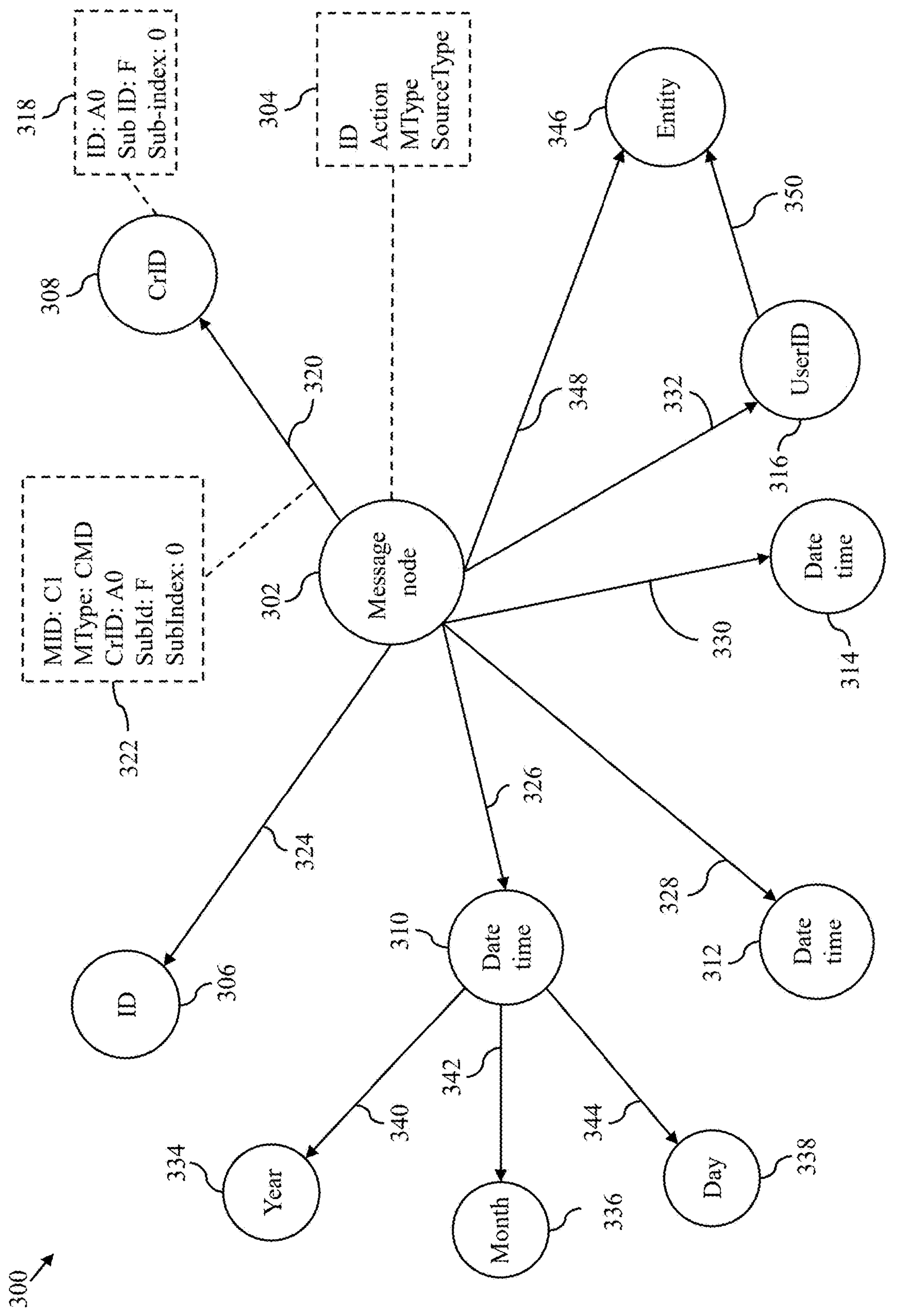
FIG. 3 is a graph illustrating association between message and attribute nodes, consistent with disclosed embodiments of the present disclosure.

FIG. 3 is a graph 300 illustrating association between message and attribute nodes, consistent with disclosed embodiments of the present disclosure. The graph 300 may correspond to a portion of the directed property graph 110. Referring to FIG. 3, the processing circuitry 104 may be configured to instantiate a message node 302 in the graph 300 that may represent the message 200.

The processing circuitry 104 may be further configured to associate at least one of the plurality of attributes associated with the message 200 as node properties of the message node 302. The node properties of the message node 302 are shown within a dotted box 304 associated with the message node 302. In the example illustrated in FIG. 3, the node properties may include the ID 202, the action 222, the message type 248 (denoted as "MType" in FIG. 3), and the source type 254 (denoted as "SourceType" in FIG. 3). However, other node properties such as the name 206, the category 208, the topic 210, the key 212, the scope 214, the access 216, the status 218, the execution 220, the created-on timestamp 224, the raised-on timestamp 226, the received-on timestamp 228, the handled-on timestamp 230, the processed-on timestamp 232, the publisher ID 234, the subscriber ID 236, the allow retry 238, the maximum retry allowed 240, the retry count 242, the retry source ID 244, or the source ID 246 may also be associated as the node properties of the message node 302. Data values of the attributes are not shown in FIG. 3 to keep the illustration concise and clear, and should not be considered a limitation of the present disclosure.

The processing circuitry 104 may be further configured to derive a set of shared attributes from the plurality of attributes associated with the message 200 and instantiate a set of attribute nodes 306-316 in the graph 300 representing the set of shared attributes. For the sake of brevity, the set of shared attributes is shown to include the ID 202, the correlation ID 204, the created-on timestamp 224, the received-on timestamp 228, the handled-on timestamp 230, and the user ID 252. However, other attributes (e.g., the raised-on timestamp 226 and the processed-on timestamp 232) may also be included in the set of shared attributes, without deviating from the scope of the present disclosure. The graph 300 may thus include the attribute node 306 that represents the ID 202, the attribute node 308 that represents the correlation ID 204, the attribute node 310 that represents the created-on timestamp 224, the attribute node 312 that represents the received-on timestamp 228, the attribute node 314 that represents the handled-on timestamp 230, and the attribute node 316 that represents the user ID 252.

The processing circuitry 104 may be further configured to determine, based on the plurality of attributes associated with the message 200, a set of attributes for each attribute node. The set of attributes may be linked with a shared attribute represented by the corresponding attribute node. The processing circuitry 104 may be further configured to associate the set of attributes as node properties of the corresponding attribute node. For example, for the attribute node 308 that represents the correlation ID 204, the ID 202, a sub-ID attribute, and a sub-index attribute may be associated as node properties of the attribute node 308. The node properties of the attribute node 308 are shown within a dotted box 318 associated with the attribute node 308 via a dotted line. The sub-ID and the sub-index attributes may be derived from the ID 202, the correlation ID 204, and the source ID 246 of the message 200. For example, if the message 200 represents a source message (e.g., the data value of the source ID 246 is 'NULL'), the sub-ID attribute may be false. Conversely, if the message 200 is generated based on the processing of another message (e.g., the source ID 246 may indicate a different (source) message, and the correlation ID 204 may be identical to that of the source message), the sub-ID attribute may be true. Further, the hierarchical level at which the message 200 may be generated may be determined based on the value associated with the sub-index attribute. If the sub-index attribute corresponds to '0', the message 200 may represent a parent message. Conversely, if the sub-index attribute corresponds to '1', the message 200 may represent a first sub-message. Based on the node properties illustrated in FIG. 3, it can be determined that the message node 302 represents a root message as the sub-ID attribute is false ('F') and the sub-index attribute is '0'.

The processing circuitry 104 may be further configured to create a set of edges between the message node 302 and the attribute nodes 306-316. For example, the processing circuitry 104 may be configured to create an edge 320 between the message node 302 and the attribute node 308 that represents the correlation ID 204. In an example, the edge 320 may be named as message_correlation ID, where the message may correspond to the message node 302 and the correlation ID may correspond to the correlation ID 204 represented by the attribute node 308. The edge 320 may couple the message node 302 to the attribute node 308 by way of an out-role and an in-role. The out-role may define an origin, for example, the message node 302 of the edge 320, and the in-role may define a destination, for example, the attribute node 308 of the edge 320. The processing circuitry 104 may be further configured to determine, for each edge, based on the plurality of attributes associated with the message 200, a set of edge attributes that is indicative of an association between the message node 302 and the corresponding attribute node. The set of edge attributes may include at least one attribute associated as the node properties of the message node 302 and at least one of the set of attributes associated as the node properties of the corresponding attribute node. Further, the processing circuitry 104 may be configured to associate the set of edge attributes as edge properties of the corresponding edge. In an example, the edge properties associated with the edge 320 may include the message ID (e.g., the ID 202), the message type 248, the correlation ID 204, the sub-ID attribute, and the sub-index attribute. In other words, the edge properties associated with the edge 320 may include at least one attribute associated as the node properties of the message node 302 (e.g., the ID 202, the message type 248, and the correlation ID 204) and at least one of the set of attributes associated as the node properties of the corresponding attribute node (e.g., the sub-ID attribute and the sub-index attribute). The edge properties associated with the edge 320 are illustrated in a dotted box 322 in the form of a key-value pair. In an embodiment, where the message node 302 may represent a root message of command type and have an ID as 'C1', the edge properties associated with the edge 320 may include the values 'C1', 'CMD', 'A0', 'F', and '0' for the message ID, the message type 248, the correlation ID 204, the sub-ID attribute, and the sub-index attribute, respectively. Similarly, edges 324-332 may couple the message node 302 to the attribute nodes 306, 310, 312, 314, and 316, respectively. The edges 324-332 may store the edge properties in a similar manner as described above.

In numerous embodiments, an attribute node may represent composite data. For example, the attribute node 310 that represents the created-on timestamp 224 may store composite data (e.g., a combination of year, month, and day). In such a scenario, attribute nodes 334-338 may be instantiated to represent year, month, and day values, respectively. Further, edges 340-344 may couple the attribute node 310 to the attribute nodes 334-338, respectively. The attribute nodes 334-338 and the edges 340-344 may be implemented in a similar manner as described above. The attribute nodes 312 and 314 may also represent composite data and additional attribute nodes and edges may be implemented for the attribute nodes 312 and 314 in a similar manner as described above.

In the real-time system 102, real-world objects such as people (e.g., users or employees), places (e.g., buildings or geographic coordinates), devices (e.g., sensors or mobile phones), or the like, may be represented as entities. Actions involving these entities (e.g., the action 222 of the message 200) like updating data, initiating specific tasks, or facilitating data exchange, may be carried out by one or more messages associated with the real-time system 102.

The processing circuitry 104 may be further configured to instantiate an entity node 346 associated with the message node 302. The entity node 346 may represent an entity associated with the real-time system 102. Further, the processing circuitry 104 may be configured to create an edge 348 between the message node 302 and the entity node 346. The processing circuitry 104 may be further configured to determine the set of edge attributes for the edge 348 and associate the set of edge attributes as edge properties of the edge 348 in a similar manner as described above. In such a scenario, the set of edge attributes may be indicative of an association between the message node 302 and the entity node 346. The entity node 346 may represent a target object on which the action 222 of the message 200 may be executed by the user associated with the real-time system 102. This association is shown in FIG. 3 by way of an edge 350 that couples the attribute node 316, that represents the user ID 252, to the entity node 346. The entity nodes are explained in detail in conjunction with FIG. 7.

Other messages and compositions thereof may be created in the directed property graph 110 in a similar manner as described above. However, for a unique data value associated with an attribute, exclusively one attribute node is instantiated. That is to say, one or more message nodes, having the same data value for the attribute created as an attribute node, may be associated with the same attribute node. In other words, any of the attribute nodes 306-316 and 334-338 may be shared between multiple message nodes.

The graph 300 facilitates response generation for a query associated with a system comprising the processing circuitry 104 and the storage element 106. For example, the processing circuitry 104 may receive a query defining 'find all the messages created on a particular date'. The reference value included in the query may correspond to a particular date for which the messages are to be identified. For the sake of brevity, it is assumed that the reference value in the query matches the data value represented by the attribute node 310. Thus, the processing circuitry 104 may identify the attribute node 310. Since a specific date may be associated with any number of messages, the processing circuitry 104 may be further configured to identify all the edges (e.g., the edge 326) associated with the attribute node 310. The processing circuitry 104 may be further configured to identify all the messages (e.g., the message 200 represented by the message node 302) created on the given date based on the edge properties of all the edges.

Utilizing the shared attribute nodes for searching the messages nodes may facilitate efficient identification of messages. For example, in the absence of the attribute node 310, the processing circuitry 104 may be required to search for the data value linked to the created-on property of each message node and subsequently verify that this data value matches the reference date. This may result in an expensive search (for example, extensive database lookups). Therefore, the attribute node 310 that represents the created-on timestamp 224 may restrict the additional traversal to each message node, thereby enabling efficient query execution.

Figure 4:
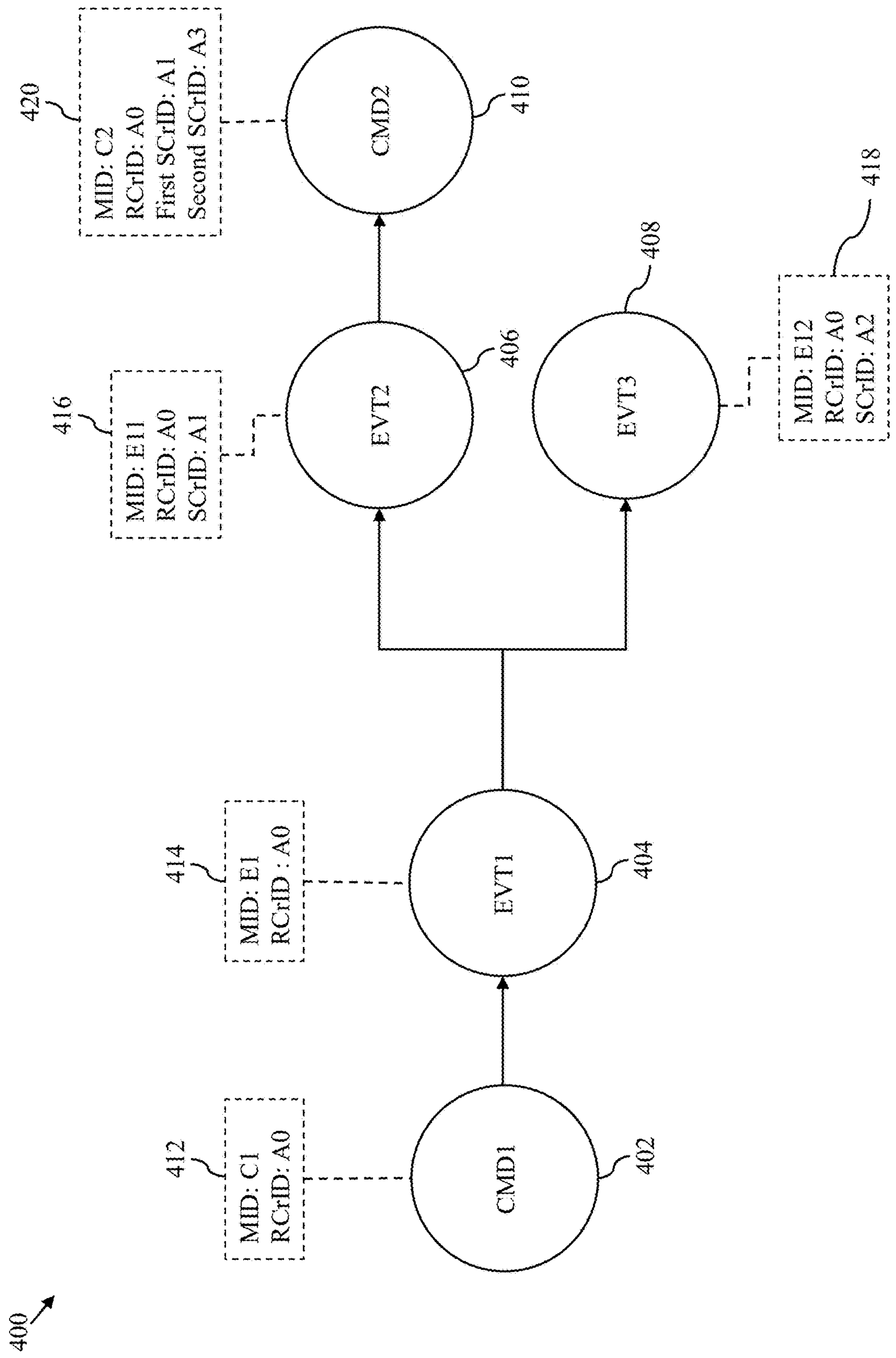
FIG. 4 is a graph illustrating a compact view of correlation between message nodes, consistent with disclosed embodiments of the present disclosure.

FIG. 4 is a graph 400 illustrating a compact view of correlation between message nodes, consistent with disclosed embodiments of the present disclosure. The graph 400 may correspond to a portion of the directed property graph 110. Various messages of the real-time system 102 may be correlated (e.g., various messages of the real-time system 102 may have a causal association therebetween). In an example, a first command message, a first event message, a second event message, a third event message, and a second command message may be correlated.

Referring to FIG. 4, the processing circuitry 104 may be configured to instantiate message nodes 402-410 in the graph 400 that may represent the first command message, the first event message, the second event message, the third event message, and the second command message, respectively. In an embodiment, the processing circuitry 104 may be further configured to associate at least one attribute with each of the message nodes 402-410 as node properties thereof. Some of the node properties associated with the message nodes 402-410 are illustrated in dotted boxes 412-420, respectively.

The message node 402 may be associated with an ID 'C1' and a root correlation ID 'A0'. The ID 'C1' is unique and is used to identify the message node 402. The root correlation ID is indicative of a transactional operation associated with the root message (e.g., the first command message) for executing a first transaction in the real-time system 102 by a microservice associated therewith. Similarly, the message node 404 may be associated with an ID 'E1' and the root correlation ID 'A0'. The message ID 'E1' is unique and is used to identify the message node 404. The association of the root correlation ID 'A0' with the message node 404 is indicative of a causal association between the message nodes 402 and 404. The term causal association is indicative of one message being generated based on the processing of another message. That is to say that the first event message is generated based on the processing of the first command message. Thus, the first command message is correlated with the first event message such that the first command message has a causal association with the first event message, and as a result, the message node 402 representing the first command message has a causal association with the message node 404 representing the first event message. The processing circuitry 104 may be further configured to create an edge between the message nodes 402 and 404 to indicate the association between them. The message node 402 may thus be a parent message node to the message node 404. The association of the root correlation ID 'A0' with the message node 404 is further indicative of the first event message being generated as a part of the execution of the first transaction associated with the message node 402.

Similarly, the second and third event messages may be generated based on the processing of the first event message. The second and third event messages may be clone event messages of the first event message. The second and third event messages may be generated based on the subscription of the first event message by two subscribers (e.g., microservices). The message nodes 406 and 408 may thus represent the clones of the message node 404. Thus, the processing circuitry 104 may be configured to create an edge between the message nodes 404 and 406, and another edge between the message nodes 404 and 408.

As illustrated in FIG. 4, the message node 406 may be associated with an ID 'E11', the root correlation ID 'A0', and a sub-correlation ID 'A1'. Similarly, the message node 408 may be associated with an ID 'E12', the root correlation ID 'A0', and a sub-correlation ID 'A2'. The association of the root correlation ID with the message nodes 406 and 408 indicates that the second and third event messages are generated as a part of the execution of the first transaction and that each of the message nodes 406 and 408 are child message nodes to the message nodes 402 and 404. The different sub-correlation IDs indicate distinct transactional operations associated with the two event messages (e.g., the second and third event messages). The association of the sub-correlation ID 'A1' with the message node 406 is indicative of a second transaction that is different from the first transaction. Further, the association of both the root correlation ID 'A0' and the sub-correlation ID 'A1' with the message node 406 is indicative of the second transaction being a sub-transaction to the first transaction. Similarly, the association of the sub-correlation ID 'A2' with the message node 408 is indicative of a third transaction that is different from but a sub-transaction to the first transaction. The message node 404 does not have a sub-correlation ID associated therewith as the first event message and the first command message are part of the same logical transaction.

The second command message may be generated based on the processing of the second event message. Thus, the processing circuitry 104 may be configured to create an edge between the message nodes 406 and 410. The edges are not labeled in FIG. 4 to keep the illustration concise and clear, and should not be considered a limitation of the present disclosure.

The message node 410 may be associated with an ID 'C2', the root correlation ID 'A0', a first sub-correlation ID 'A1', and a second sub-correlation ID 'A3'. The association of the root correlation ID 'A0' and the first sub-correlation ID 'A1' with the message node 410 indicates that the second command message is generated as a part of the execution of the first transaction and that the message node 410 is a child message node to the message nodes 402, 404, and 406. The association of the second sub-correlation ID 'A3' with the message node 410 is indicative of a fourth transaction that is different from the second transaction. Further, the association of both the first sub-correlation ID 'A1' and the second sub-correlation ID 'A3' is indicative of the fourth transaction being a sub-transaction to the second transaction.

The association of a common correlation ID (e.g., the root correlation ID 'A0') with two or more message nodes is indicative of a causal association therebetween. Further, the association of a new correlation ID (e.g., the sub-correlation IDs 'A1', 'A2', and 'A3') is indicative of a new transaction being initiated based on message processing. Although not shown, each of the message nodes 402-410 may be associated with the same user ID, which indicates that the message nodes 402-410 are associated with the same user.

The graph 400 may enable optimized query processing. For example, the processing circuitry 104 may receive a query indicative of an analysis to be performed for the first command message. For such an analysis, all the messages correlated to the first command message may be required. In such an embodiment, the processing circuitry 104 may be configured to identify the message nodes 404-410 that are correlated to the message node 402 based on the root correlation ID 'A0' and generate a response to the query based on the message nodes 402-410. The association of the common correlation ID results in optimized tracking of the correlated message nodes.

In FIG. 4, the correlated message nodes 402-410 are illustrated in the compact form. That is to say that compositions associated therewith are not shown in FIG. 4. While performing analytics on any message node, message compositions may be required, and hence, it is important to understand the structure of the compositions of correlated messages in the directed property graph 110.

Figure 5:
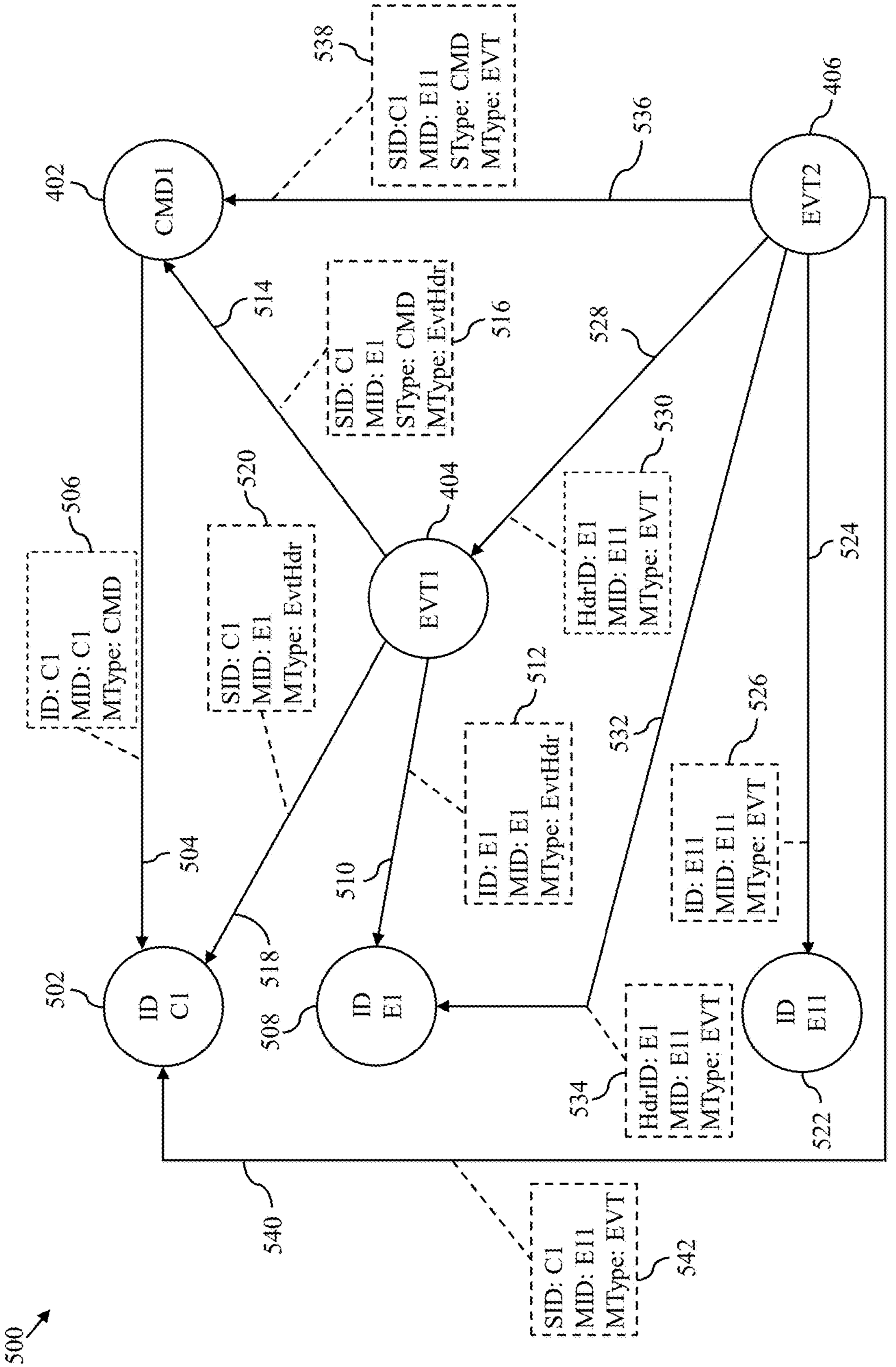
FIG. 5 is a graph illustrating an expanded view of correlation between message nodes, consistent with disclosed embodiments of the present disclosure.

FIG. 5 is a graph 500 illustrating an expanded view of correlation between message nodes, consistent with disclosed embodiments of the present disclosure. The graph 500 may correspond to a portion of the directed property graph 110. For the sake of simplicity, FIG. 5 illustrates exclusively the message nodes 402-406, the compositions thereof, and the correlation therebetween. However, other correlated message nodes may be implemented in a similar manner.

The processing circuitry 104 may be configured to instantiate the message nodes 402-406 that may represent the first command message, the first event message, and the second event message, respectively. Each of the first command message, the first event message, and the second event message may have a plurality of attributes associated therewith. The processing circuitry 104 may be further configured to associate at least one attribute with each of the message nodes 402-406 as node properties thereof. Further, the processing circuitry 104 may be configured to derive a set of shared attributes for each of the message nodes 402-406 and instantiate a set of attribute nodes representing the set of shared attributes. For the sake of simplicity, an ID is assumed to be the shared attribute. However, in several embodiments, other attributes may be selected as shared attributes.

As illustrated in FIG. 5, the processing circuitry 104 may be configured to instantiate an attribute node 502 that may represent the ID of the message node 402. The attribute node 502 may store a data value 'C1' indicative of the ID of the first command message. Although not shown, the processing circuitry 104 may be configured to determine a set of attributes for the attribute node 502 and associate the determined set of attributes as node properties of the attribute node 502. The determined set of attributes may be linked with the shared attribute (e.g., the ID) represented by the attribute node 502. The processing circuitry 104 may be configured to create an edge 504 between the message node 402 and the attribute node 502. The edge 504 may have various edge attributes associated as edge properties thereof. The edge properties of the edge 504 may include at least one attribute associated as the node properties of the message node 402 and at least one attribute associated as the node properties of the attribute node 502. The edge properties of the edge 504 is illustrated in a dotted box 506. The dotted box 506 is shown to include some of the edge attributes in the form of key-value pairs such as ID: 'C1', message ID: 'C1', and message type: 'CMD'.

Similarly, the processing circuitry 104 may be further configured to instantiate an attribute node 508 that may represent the ID of the message node 404, associate a set of attributes as node properties of the attribute node 508, and create an edge 510 between the message node 404 and the attribute node 508. The edge 510 may have various edge attributes associated as edge properties thereof. The edge properties of the edge 510 are illustrated in a dotted box 512. The dotted box 512 is shown to include some of the edge attributes in the form of key-value pairs such as ID: 'E1', message ID: 'E1', and message type: 'EventHeader' (denoted as 'EvtHdr' in FIG. 5).

As explained in FIG. 4, the processing of the first command message leads to the generation of the first event message. Therefore, the first command message corresponds to a source message of the first event message. Consequently, the message node 402 corresponds to a source message node of the message node 404. Thus, the processing circuitry 104 may be further configured to create an edge 514 between the message nodes 402 and 404, determine a set of edge attributes for the edge 514 that is indicative of an association between the message nodes 402 and 404, and associate the determined set of edge attributes as edge properties of the edge 514. The determined set of edge attributes may include at least one attribute associated as the node properties of the message node 402 and at least one attribute associated as the node properties of the message node 404. The edge properties of the edge 514 is illustrated in a dotted box 516. The dotted box 516 is shown to include some of the edge attributes in the form of key-value pair such as source ID: 'C1', message ID: 'E1', source type: 'CMD', and message type: 'EvtHdr'. The edge 514 may thus indicate that the first command message is the source message to the first event message.

Additionally, the ID 'C1' associated with the first command message may correspond to a source ID for the first event message. Thus, the data value associated with the attribute node 502 may be shared between the message nodes 402 and 404. Thus, the processing circuitry 104 may be further configured to create an edge 518 between the message node 404 and the attribute node 502, determine a set of edge attributes for the edge 518 that is indicative of an association between the message node 404 and the attribute node 502, and associate the determined set of edge attributes as edge properties of the edge 518. The determined set of edge attributes may include at least one attribute associated as the node properties of the attribute node 502 and at least one attribute associated as the node properties of the message node 404. The edge properties of the edge 518 is illustrated in a dotted box 520. The dotted box 520 is shown to include some of the edge attributes in the form of key-value pairs such as source ID: 'C1', message ID: 'E1', and message type: 'EvtHdr'. The edge 518 may thus indicate that the ID 'C1' is the source ID of the first event message.

The above-mentioned structure thus describes the compositions of the message nodes 402 and 404 as well as the correlation therebetween.

The processing circuitry 104 may be configured to instantiate an attribute node 522 that may represent the ID of the message node 406, associate a set of attributes as node properties of the attribute node 522, and create an edge 524 between the message node 406 and the attribute node 522. The edge 524 may have various edge attributes associated as edge properties thereof. The edge properties of the edge 524 is illustrated in a dotted box 526. The dotted box 526 is shown to include some of the edge attributes in the form of key-value pairs such as ID: 'E11', message ID: 'E11', and message type: 'EVT'.

Further, as explained above in FIG. 4, the processing of the first event message leads to the generation of the second event message. Thus, the processing circuitry 104 may be further configured to create an edge 528 between the message nodes 404 and 406, determine a set of edge attributes for the edge 528, and associate the determined set of edge attributes as edge properties of the edge 528. The edge properties of the edge 528 is illustrated in a dotted box 530. The dotted box 530 is shown to include some of the edge attributes in the form of key-value pairs such as header ID: 'E1', message ID: 'E11', and message type: 'EVT'. The edge 528 may thus indicate that the first event message is the event header to the second event message.

Additionally, the ID 'E1' associated with the first event message may correspond to a header ID for the second event message. Thus, the data value associated with the attribute node 508 may be shared between the message nodes 404 and 406. Thus, the processing circuitry 104 may be further configured to create an edge 532 between the message node 406 and the attribute node 508, determine a set of edge attributes for the edge 532, and associate the determined set of edge attributes as edge properties of the edge 532. The edge properties of the edge 532 is illustrated in a dotted box 534. The dotted box 534 is shown to include some of the edge attributes in the form of key-value pairs such as header ID: 'E1', message ID: 'E11', and message type: 'EVT'. The edge 532 may thus indicate that the ID 'E1' is the header ID of the second event message.

As explained in FIG. 4, the second event message is generated as a part of the execution of the first transaction and that the second event message is a child message of the first command message and the first event message. That is to say, the first command message corresponds to a source message to the second event message. Thus, the processing circuitry 104 may be further configured to create an edge 536 between the message nodes 402 and 406, determine a set of edge attributes for the edge 536, and associate the determined set of edge attributes as edge properties of the edge 536. The edge properties of the edge 536 is illustrated in a dotted box 538. The dotted box 538 is shown to include some of the edge attributes in the form of key-value pair such as source ID: 'C1', message ID: 'E11', source type: 'CMD', and message type: 'EVT'. The edge 536 may thus indicate that the first command message is the source message to the second event message.

Additionally, the ID 'C1' associated with the first command message may correspond to a source ID for the second event message. Thus, the data value associated with the attribute node 502 may be shared between the message nodes 402 and 406. The processing circuitry 104 may be further configured to create an edge 540 between the message node 406 and the attribute node 502, determine a set of edge attributes for the edge 540, and associate the determined set of edge attributes as edge properties of the edge 540. The edge properties of the edge 540 is illustrated in a dotted box 542. The dotted box 542 is shown to include some of the edge attributes in the form of key-value pairs such as source ID: 'C1', message ID: 'E11', and message type: 'EVT'. The edge 540 may thus indicate that the ID 'C1' is the source ID of the second event message.

The graph 500 illustrated in FIG. 5 describes the compositions of and correlation between various message nodes. The structure of the graph 500, especially the sharing of attribute nodes and edges between message nodes, enables optimized query processing. In such a graph 500, a response to a query may be generated based on at least one of a group consisting of the message nodes (e.g., the message nodes 402-406), the node properties of each message node, the attribute nodes (e.g., the attribute nodes 502, 508, and 522), the node properties of each attribute node, the edges (e.g., the edges 504, 510, 514, 518, 524, 528, 532, 536, and 540), and the edge properties of each edge. For example, the processing circuitry 104 may receive a query requiring to identify all messages associated with a data value 'C1'. To execute the query, the processing circuitry 104 may identify, in the directed property graph 110, the attribute node comprising the data value 'C1' (for example, the attribute node 502). Further, the processing circuitry 104 may identify the edges associated with the attribute node 502 (e.g., the edges 504, 518, and 540). Based on the edge properties of the edges 504, 518, and 540, the processing circuitry 104 may identify the first command message, the first event message, and the second event message, respectively. In an embodiment, the directed property graph 110 may be implemented as distinct tables for message nodes, node properties of message nodes, edges, edge properties, attribute nodes, and node properties of attribute nodes. In such a scenario, the processing circuitry 104 may access the attribute nodes table to identify the attribute node storing the data value 'C1' and determine the edges associated with the identified attribute node. Further, the processing circuitry 104 may access the edges table to determine the edge properties ID of the identified edges, and then access the edge properties table to identify the messages. The processing circuitry 104 may then generate a response to the query, the generated response including the first command message, the first event message, and the second event message.

In the aforementioned example, if all the attributes of messages were associated as node properties, a significantly large node properties table would have to be searched to identify the attribute 'C1' and associated messages. Such a query would be expensive. Alternatively, instantiating all the attributes as attribute nodes may be costly in terms of memory utilization. The solution of the present disclosure, that involves having limited attributes (e.g., the data value 'C1') as the attribute nodes, ensures that the memory utilization is less as well as the query processing is optimized.

The structure of the graph 500 is not limited to correlated messages being generated from the processing of other messages. In some scenarios, one message may fail (e.g., may not be communicated successfully between a source microservice and a destination microservice), and hence, the source microservice may create another message that is a clone of the original message. The generation of the cloned message is possible only if the data value of the attribute allow retry associated with the original message is true. In such cases, the static information of the cloned message may be the same as that of the original message. However, the dynamic information of the cloned message may be different from the original message and may be specific to the processing of the cloned message. The processing circuitry 104 may instantiate a cloned message node to represent the cloned message and may link the two message nodes in the similar manner described above for the message nodes 402 and 404. If the cloned message fails too, the same process may be repeated until the number of recreations is less than the data value of the maximum retry allowed attribute of the original message.

Figure 6:
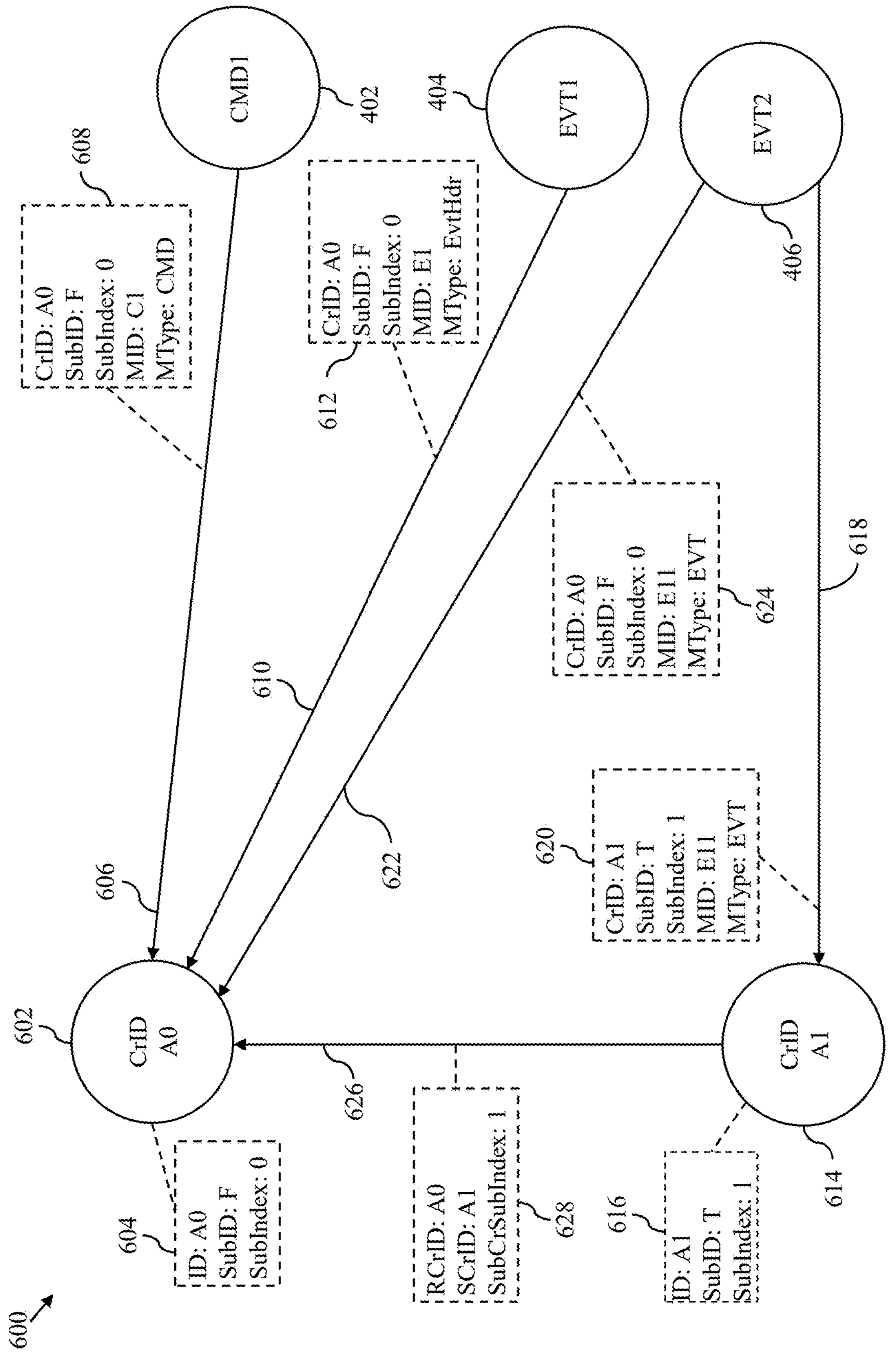
FIG. 6 is a graph illustrating another expanded view of correlation between message nodes, consistent with disclosed embodiments of the present disclosure.

FIG. 6 is a graph 600 illustrating another expanded view of correlation between message nodes, consistent with disclosed embodiments of the present disclosure. The graph 600 may correspond to a portion of the directed property graph 110. For the sake of simplicity, FIG. 6 illustrates exclusively the message nodes 402-406, the compositions thereof, and the correlation therebetween. However, other correlated message nodes may be implemented in a similar manner.

The processing circuitry 104 may be configured to instantiate the message nodes 402-406 that may represent the first command message, the first event message, and the second event message, respectively. Each of the first command message, the first event message, and the second event message may have a plurality of attributes associated therewith. The processing circuitry 104 may be further configured to associate at least one attribute with each of the message nodes 402-406 as node properties thereof. Further, the processing circuitry 104 may be configured to derive a set of shared attributes for each of the message nodes 402-406 and instantiate a set of attribute nodes representing the set of shared attributes. For the sake of simplicity, a correlation ID is assumed to be the shared attribute. However, in several embodiments, other attributes may be selected as shared attributes.

As illustrated in FIG. 6, the processing circuitry 104 may be configured to instantiate an attribute node 602 that may represent the correlation ID of the message node 402. The attribute node 602 may store a data value 'A0' indicative of the correlation ID of the first command message. The processing circuitry 104 may be configured to determine a set of attributes for the attribute node 602 and associate the determined set of attributes as node properties of the attribute node 602. The determined set of attributes may be linked with the shared attribute (e.g., the correlation ID) represented by the attribute node 602. The node properties of the attribute node 602 are illustrated in a dotted box 604. The dotted box 604 is shown to include some of the attributes in the form of key-value pairs such as correlation ID: 'A0', subID: 'F', and sub-index: '0'. The processing circuitry 104 may be configured to create an edge 606 between the message node 402 and the attribute node 602. The edge 606 may have various edge attributes associated as edge properties thereof. The edge properties of the edge 606 may include at least one attribute associated as the node properties of the message node 402 and at least one attribute associated as the node properties of the attribute node 602. The edge properties of the edge 606 is illustrated in a dotted box 608. The dotted box 608 is shown to include some of the attributes in the form of key-value pair such as correlation ID: 'A0', SubID: 'F', SubIndex: '0', message ID: 'C1', and message type: 'CMD'.

As explained in FIG. 4, the first event message has the same correlation ID as the first command message. Thus, the processing circuitry 104 may be configured to create an edge 610 between the message node 404 (that represents the first event message) and the attribute node 602. The edge 610 may have various edge attributes associated as edge properties thereof. The edge properties of the edge 610 is illustrated in a dotted box 612. The dotted box 612 is shown to include some of the attributes in the form of key-value pairs such as correlation ID: 'A0', SubID: 'F', SubIndex: '0', message ID: 'E1', and message type: 'EvtHdr'. As the subID is 'F', the correlation ID 'A0' may be the root correlation ID of the first event message.

When the second event message is generated based on the processing of the first event message, the transaction changes. Thus, the second event message may have an additional correlation ID (e.g., the sub-correlation ID). The processing circuitry 104 may be configured to instantiate an attribute node 614 that may represent the correlation ID 'A1'. The processing circuitry 104 may be further configured to determine a set of attributes for the attribute node 614 and associate the determined set of attributes as node properties of the attribute node 614. The determined set of attributes may be linked with the shared attribute (e.g., the correlation ID) represented by the attribute node 614. The node properties of the attribute node 614 are illustrated in a dotted box 616. The dotted box 616 is shown to include some of the attributes in the form of key-value pairs such as correlation ID: 'A1', subID: 'True' (denoted as 'T' in FIG. 6), and sub-index: '1'. The processing circuitry 104 may be configured to create an edge 618 between the message node 406 and the attribute node 614. The edge 618 may have various edge attributes associated as edge properties thereof. The edge properties of the edge 618 is illustrated in a dotted box 620. The dotted box 620 is shown to include some of the attributes in the form of key-value pairs such as correlation ID: 'A1', SubID: 'T', SubIndex: '1', message ID: 'E11', and message type: 'EVT'. The SubID: 'T' indicates that the correlation ID 'A1' is not the root correlation ID and the SubIndex: '1' indicates that the second event message is generated at a first level of the hierarchy within the first transaction.

As the correlation ID 'A0' corresponds to the root correlation ID for the second event message, the processing circuitry 104 may be configured to create an edge 622 between the message node 406 (that represents the second event message) and the attribute node 602. The edge 622 may have various edge attributes associated as edge properties thereof. The edge properties of the edge 622 is illustrated in a dotted box 624. The dotted box 624 is shown to include some of the attributes in the form of key-value pair such as correlation ID: 'A0', SubID: 'F', SubIndex: '0', message ID: 'E11', and message type: 'EVT'. As the subID is 'F', the correlation ID 'A0' may be the root correlation ID of the second event message.

The processing circuitry 104 may be further configured to create an edge 626 between the attribute nodes 602 and 614. The edge 626 may have various edge attributes associated as edge properties thereof. The edge properties of the edge 626 may include at least one attribute associated as the node properties of the attribute node 602 and at least one attribute associated as the node properties of the attribute node 614. The edge properties of the edge 626 may be indicative of an association between the attribute nodes 602 and 614. The edge properties of the edge 626 is illustrated in a dotted box 628. The dotted box 628 is shown to include some of the attributes in the form of key-value pairs such as root correlation ID: 'A0', sub correlation ID: 'A1', and sub correlation sub-index: '1'.

Although not shown, the graph 600 may further include other attribute nodes representing different correlation IDs, with edges coupling each attribute node to a previous attribute node (e.g., a previous correlation ID), any intermediate attribute nodes, or the root attribute node (e.g., the attribute node 602 representing the root correlation ID).

The graph 600 illustrated in FIG. 6 describes the compositions of and correlation between various message nodes. The structure of the graph 600, especially the sharing of attribute nodes, edges between message nodes, and edges between attribute nodes, enables optimized query processing. In such a graph 600, a response to a query may be generated based on at least one of a group consisting of the message nodes (e.g., the message nodes 402-406), the node properties of each message node, the attribute nodes (e.g., the attribute nodes 602 and 614), the node properties of each attribute node, the edges (e.g., the edges 606, 610, 618, 622, and 626), and the edge properties of each edge. For example, the processing circuitry 104 may receive a query requiring to build an entire message trail based on the correlation ID 'A1'.

To execute the query, the processing circuitry 104 may identify, in the directed property graph 110, the attribute node comprising the data value 'A1' (for example, the attribute node 614). Based on the node properties of the attribute node 614, the processing circuitry 104 may determine that the correlation ID 'A1' is not the root correlation ID. Further, the processing circuitry 104 may identify the edge 626 linking attribute node 614 to the attribute node 602 (e.g., the root correlation ID). The processing circuitry 104 may identify all edges (e.g., the edges 606, 610, and 622) associated with the attribute node 602. Based on the edge properties of the edges 606, 610, and 622, the processing circuitry 104 may identify the first command message, the first event message, and the second event message, respectively. The processing circuitry 104 may then generate a response to the query, the generated response including the message trail comprising the first command message, the first event message, and the second event message.

Figure 7:
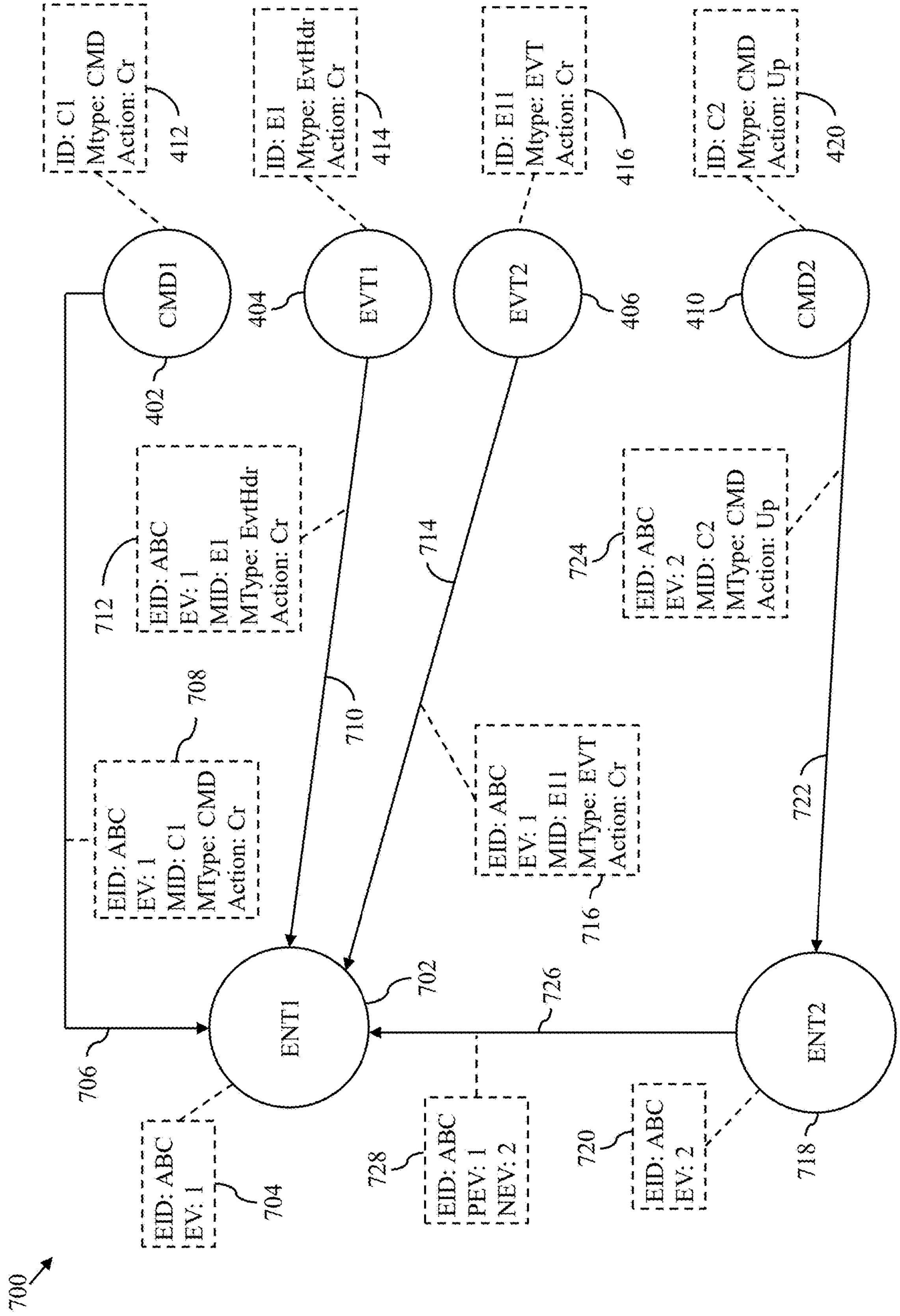
FIG. 7 is a graph illustrating association between message and entity nodes, consistent with disclosed embodiments of the present disclosure.

FIG. 7 is a graph 700 illustrating association between message and entity nodes, consistent with disclosed embodiments of the present disclosure. The graph 700 may correspond to a portion of the directed property graph 110.

The processing circuitry 104 may be configured to instantiate the message node 402 that may represent the first command message. The first command message may have a plurality of attributes associated therewith. The processing circuitry 104 may be further configured to associate at least one attribute as node properties of the message node 402. Some of the node properties of the message node 402 are illustrated in the dotted box 412. The dotted box 412 is shown to include some of the attributes in the form of key-value pairs such as ID: 'C1', message type: 'CMD', and action: 'Create' (denoted as 'Cr' in FIG. 7). The processing circuitry 104 may be configured to instantiate an entity node 702 associated with the message node 402. The entity node 702 may represent a target object on which an action (e.g., the action 222) of the first command message may be executed. In an embodiment, the entity represented by the entity node 702 may be created, in the directed property graph 110, based on the processing of the first command message. In other words, the first command message may comprise details required to create the entity represented by the entity node 702.

The processing circuitry 104 may be further configured to determine a set of entity attributes for the entity node 702 and associate the set of entity attributes as node properties of the entity node 702. The node properties of the entity node 702 are illustrated in a dotted box 704. The dotted box 704 is shown to include some of the attributes in the form of key-value pairs such as entity ID: 'ABC' and entity version: '1'. The processing circuitry 104 may be further configured to create an edge 706 between the message node 402 and the entity node 702, determine a set of edge attributes that is indicative of an association between the message node 402 and the entity node 702, and associate the set of edge attributes as edge properties of the edge 706. The set of edge attributes may include at least one of the set of entity attributes (e.g., the node properties of the entity node 702) and at least one attribute associated as the node properties of the message node 402. The edge properties of the edge 706 is illustrated in a dotted box 708. The dotted box 708 is shown to include some of the attributes in the form of key-value pairs such as entity ID: 'ABC', entity version: '1', message ID: 'C1', message type: 'CMD', and action: 'Cr'.

As explained in FIG. 4, the first event message may be generated based on the processing of the first command message. The first event message may comprise details associated with the first command message, in that the first event message may record the result of the execution of the first command message (e.g., creation of the entity represented by the entity node 702). Further, the first event message may be subscribed to by a microservice. The subscription of the first event message by the microservice may result in the generation of the second event message. Thus, both the first and second event messages may be associated with the entity version '1'.

Therefore, the processing circuitry 104 may be further configured to instantiate the message nodes 404 and 406 that may represent the first and second event messages, respectively. Further, the processing circuitry 104 may be configured to associate at least one attribute as node properties of the message nodes 404 and 406. Some of the node properties of the message nodes 404 and 406 are illustrated in the dotted boxes 414 and 416, respectively. The dotted box 414 is shown to include some of the attributes in the form of key-value pair such as ID: 'E1', message type: 'EvtHdr', and action: 'Cr'. Similarly, the dotted box 416 is shown to include some of the attributes in the form of key-value pair such as ID: 'E11', message type: 'EVT', and action: 'Cr'. The processing circuitry 104 may be further configured to create an edge 710 between the message node 404 and the entity node 702, determine a set of edge attributes for the edge 710, and associate the set of edge attributes as edge properties of the edge 710. The edge properties of the edge 710 is illustrated in a dotted box 712. The dotted box 712 is shown to include some of the attributes in the form of key-value pair such as entity ID: 'ABC', entity version: '1', message ID: 'E1', message type: 'EvtHdr', and action: 'Cr'. Similarly, the processing circuitry 104 may be configured to create an edge 714 between the message node 406 and the entity node 702, determine a set of edge attributes for the edge 714, and associate the set of edge attributes as edge properties of the edge 714. The edge properties of the edge 714 is illustrated in a dotted box 716. The dotted box 716 is shown to include some of the attributes in the form of key-value pairs such as entity ID: 'ABC', entity version: '1', message ID: 'E11', message type: 'EVT', and action: 'Cr'.

The second event message may then be handled by another microservice. Based on the handling of the second event message, the second command message may be generated. The second command message may correspond to an update operation associated with the entity represented by the entity node 702. The second command message may execute the operation associated therewith and update the entity represented by the entity node 702. Thus, the processing circuitry 104 may be further configured to instantiate the message node 410 that may represent the second command message, and associate at least one attribute as node properties of the message node 410. Some of the node properties of the message node 410 are illustrated in the dotted box 420. The dotted box 420 is shown to include some of the attributes in the form of key-value pair such as ID: 'C2', message type: 'CMD', and action: 'Up'.

The processing circuitry 104 may be configured to instantiate an entity node 718 associated with the message node 410. The entity node 718 may correspond to a next version of the entity node 702. In an embodiment, the entity represented by the entity node 718 may be created, in the directed property graph 110, based on the processing of the second command message. In an embodiment, the update operation on the entity represented by the entity node 702 may be initiated by the same user that created the entity. Therefore, the value associated with the node property entity ID is 'ABC'. Further, the entity represented by the entity node 718 may comprise a different instance of data at another point in time, therefore, the node version associated with the entity node 718 may be '2'.

The processing circuitry 104 may be further configured to determine a set of entity attributes for the entity node 718 and associate the set of entity attributes as node properties of the entity node 718. The node properties of the entity node 718 are illustrated in a dotted box 720. The dotted box 720 is shown to include some of the attributes in the form of key-value pairs such as entity ID: 'ABC' and entity version: '2'. The processing circuitry 104 may be further configured to create an edge 722 between the message node 410 and the entity node 718, determine a set of edge attributes that is indicative of an association between the message node 410 and the entity node 718, and associate the set of edge attributes as edge properties of the edge 722. The set of edge attributes may include at least one of the set of entity attributes (e.g., the node properties of the entity node 718) and at least one attribute associated as the node properties of the message node 410. The edge properties of the edge 722 is illustrated in a dotted box 724. The dotted box 724 is shown to include some of the attributes in the form of key-value pairs such as entity ID: 'ABC', entity version: '2', message ID: 'C2', message type: 'CMD', and action: 'Up'.

The processing circuitry 104 may be further configured to create an edge 726 between the entity nodes 702 and 718, determine a set of edge attributes that is indicative of an association between the entity nodes 702 and 718, and associate the set of edge attributes as edge properties of the edge 726. The set of edge attributes may include at least one of the set of entity attributes (e.g., the node properties) of the entity node 718 and at least one of the set of entity attributes (e.g., the node properties) of the entity node 702. The edge properties of the edge 726 is illustrated in a dotted box 728. The dotted box 728 is shown to include some of the attributes in the form of key-value pair such as entity ID: 'ABC', previous entity version (denoted as "PEV"): '1', and next entity version (denoted as "NEV"): '2'.

Although not shown, the node properties of message and entity nodes and the edge properties of edges may include additional attributes such as name, category, scope, user ID, or the like.

Although not shown, the graph 700 may further include other entity nodes representing different entity versions, with edges coupling each entity node to a previous entity node (e.g., a previous entity version), any intermediate entity nodes, or the root entity node (e.g., the entity node 702 representing the first entity version).

The graph 700 illustrated in FIG. 7 describes the associations between message and entity nodes. The structure of the graph 700, especially the sharing of entity nodes, edges between message and entity nodes, and edges between entity nodes, enables optimized query processing. In such a graph 700, a response to a query may be generated based on at least one of a group consisting of the message nodes (e.g., the message nodes 402-406 and 410), the node properties of each message node, the entity nodes (e.g., the entity nodes 702 and 718), the node properties of each entity node, the edges (e.g., the edges 706, 710, 714, 722, and 726), and the edge properties of each edge. For example, the processing circuitry 104 may receive a query requiring to perform analysis based on historical data stored in the directed property graph 110. To execute the query, the processing circuitry 104 may identify a latest entity node in the directed property graph 110 (e.g., the entity node 718). Further, the processing circuitry 104 may identify the edge 726 associated with the entity node 718. Based on the edge properties of the edge 726 (e.g., the previous entity version: '1'), the processing circuitry 104 may determine the presence of one more entity node (e.g., an initial entity node). The processing circuitry 104 may identify the entity node 702 and generate a response to the query based on the analysis performed using the entity node 702.

In a conventional system, an update operation may involve modifying the existing data in a system. Such operation may replace current data, that is associated with an entity, with new data, associated with the update operation. That is to say, the update operation may overwrite the previous value. Therefore, the historical data may not be available. The non-availability of historical data in the system may prevent the execution of various critical operations that may require historical data for execution thereof, such as trend analysis, predictive analysis, auditing, automating a task, detecting long-term anomalies, or the like. The entity nodes 702 and 718 allow storing of all the instances of data. Therefore, historical data is preserved. Additionally, the edge 726 allows efficient traversal in the directed property graph 110. Beneficially, such traversal is performed in a manner that is optimal and significantly reduces the time and processing complexity required for the identification of the entity nodes 702 and 718.

Figure 8:
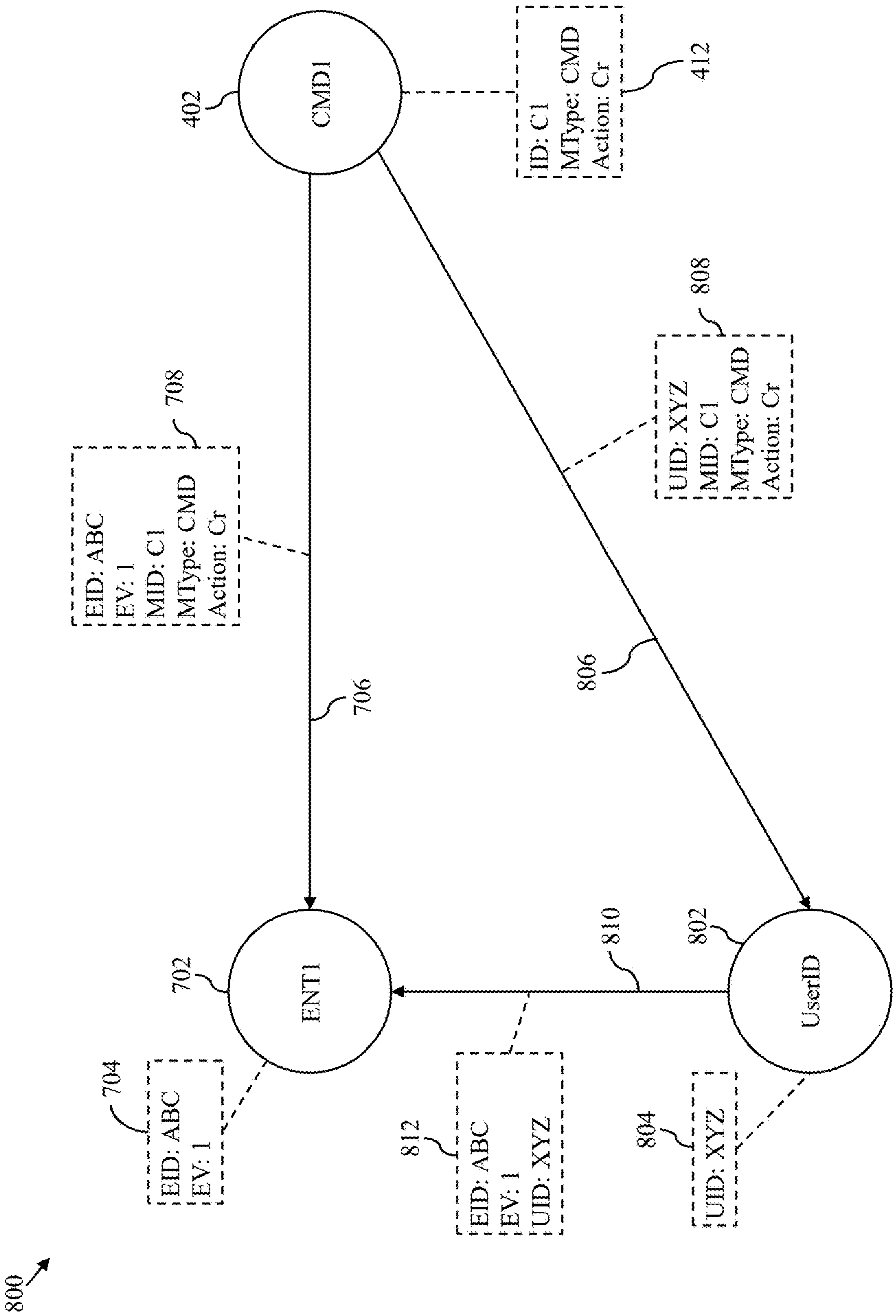
FIG. 8 is a graph illustrating association between message, entity, and attribute nodes, consistent with disclosed embodiments of the present disclosure.

FIG. 8 is a graph 800 illustrating association between message, entity, and attribute nodes, consistent with disclosed embodiments of the present disclosure. The graph 800 may correspond to a portion of the directed property graph 110.

As described in FIG. 8, the processing circuitry 104 may instantiate the message node 402 that may represent the first command message and associate at least one attribute as node properties of the message node 402. Some of the node properties of the message node 402 are illustrated in the dotted box 412. The dotted box 412 is shown to include some of the attributes in the form of key-value pairs such as ID: 'C1', message type: 'CMD', and action: 'Cr'. Further, the processing circuitry 104 may instantiate the entity node 702 associated with the message node 402. In an embodiment, the entity represented by the entity node 702 may be created, in the directed property graph 110, based on the processing of the first command message. The processing circuitry 104 may determine a set of entity attributes for the entity node 702 and associate the set of entity attributes as node properties of the entity node 702. The node properties of the entity node 702 are illustrated in the dotted box 704. The dotted box 704 is shown to include some of the attributes in the form of key-value pairs such as entity ID: 'ABC' and entity version: '1'. The processing circuitry 104 may create the edge 706 between the message node 402 and the entity node 702, determine a set of edge attributes that is indicative of an association between the message node 402 and the entity node 702, and associate the set of edge attributes as edge properties of the edge 706. The edge properties of the edge 706 is illustrated in the dotted box 708. The dotted box 708 is shown to include some of the attributes in the form of key-value pairs such as entity ID: 'ABC', entity version: '1', message ID: 'C1', message type: 'CMD', and action: 'Cr'.

As described in FIG. 3, the processing circuitry 104 may derive a set of shared attributes from the plurality of attributes associated with the first command message. For the sake of ongoing discussion, the shared attribute corresponds to a user ID. The processing circuitry 104 may instantiate an attribute node 802 in the graph 800 representing the user ID. The processing circuitry 104 may determine a set of attributes for the attribute node 802 and associate the set of attributes as node properties of the attribute node 802. The node properties of the attribute node 802 are shown within a dotted box 804. The dotted box 804 is shown to include some of the attributes in the form of key-value pairs such as user ID: 'XYZ'. The processing circuitry 104 may create an edge 806 between the message node 402 and the attribute node 802, determine a set of edge attributes that is indicative of an association between the message node 402 and the attribute node 802, and associate the set of edge attributes as edge properties of the edge 806. The edge properties of the edge 806 is illustrated in a dotted box 808. The dotted box 808 is shown to include some of the attributes in the form of key-value pair such as user ID: 'XYZ', message ID: 'C1', message type: 'CMD', and action: 'Cr'. The processing circuitry 104 may create an edge 810 between the entity node 702 and the attribute node 802, determine a set of edge attributes that is indicative of an association between the entity node 702 and the attribute node 802, and associate the set of edge attributes as edge properties of the edge 810. The edge properties of the edge 810 is illustrated in a dotted box 812. The dotted box 812 is shown to include some of the attributes in the form of key-value pair such as entity ID: 'ABC', entity version: '1', and user ID: 'XYZ'.

The graph 800 illustrated in FIG. 8 describes the associations between message, attribute, and entity nodes. The structure of the graph 800, especially the edges between message and entity nodes, entity and attribute nodes, and message and attribute nodes, enables optimized query processing. In such a graph 800, a response to a query may be generated based on at least one of a group consisting of the message nodes (e.g., the message node 402), the node properties of each message node, the entity nodes (e.g., the entity node 702), the node properties of each entity node, the attribute nodes (e.g., the attribute node 802), the node properties of each attribute node, the edges (e.g., the edges 706, 806, and 810), and the edge properties of each edge. For example, the processing circuitry 104 may receive a query comprising an ID 'XYZ' and requiring to identify all the entities associated with the ID. The processing circuitry 104 may identify the attribute node 802 that comprises the data value 'XYZ'. Further, the processing circuitry 104 may identify the edge 810 linking the attribute node 802 to the entity node 702. From the edge properties of the edge 810, the processing circuitry 104 may determine that an entity having an entity ID 'ABC' is associated with the user ID 'XYZ'. The processing circuitry 104 may determine that the entity with the ID 'ABC' is a first entity (entity version: '1'). This may in turn imply that there is no other entity created. Therefore, the processing circuitry 104 may generate a response including a count of '1' that represents the total number entities associated with the ID 'XYZ'.

Designing the user ID as the attribute node allows efficient identification of all the entities executed by a specific user. This may further allow the derivation of various insights, such as the total number of entities processed by a specific user, all the operations performed by the specific user in a given interval of time, or the like.

Figure 9:
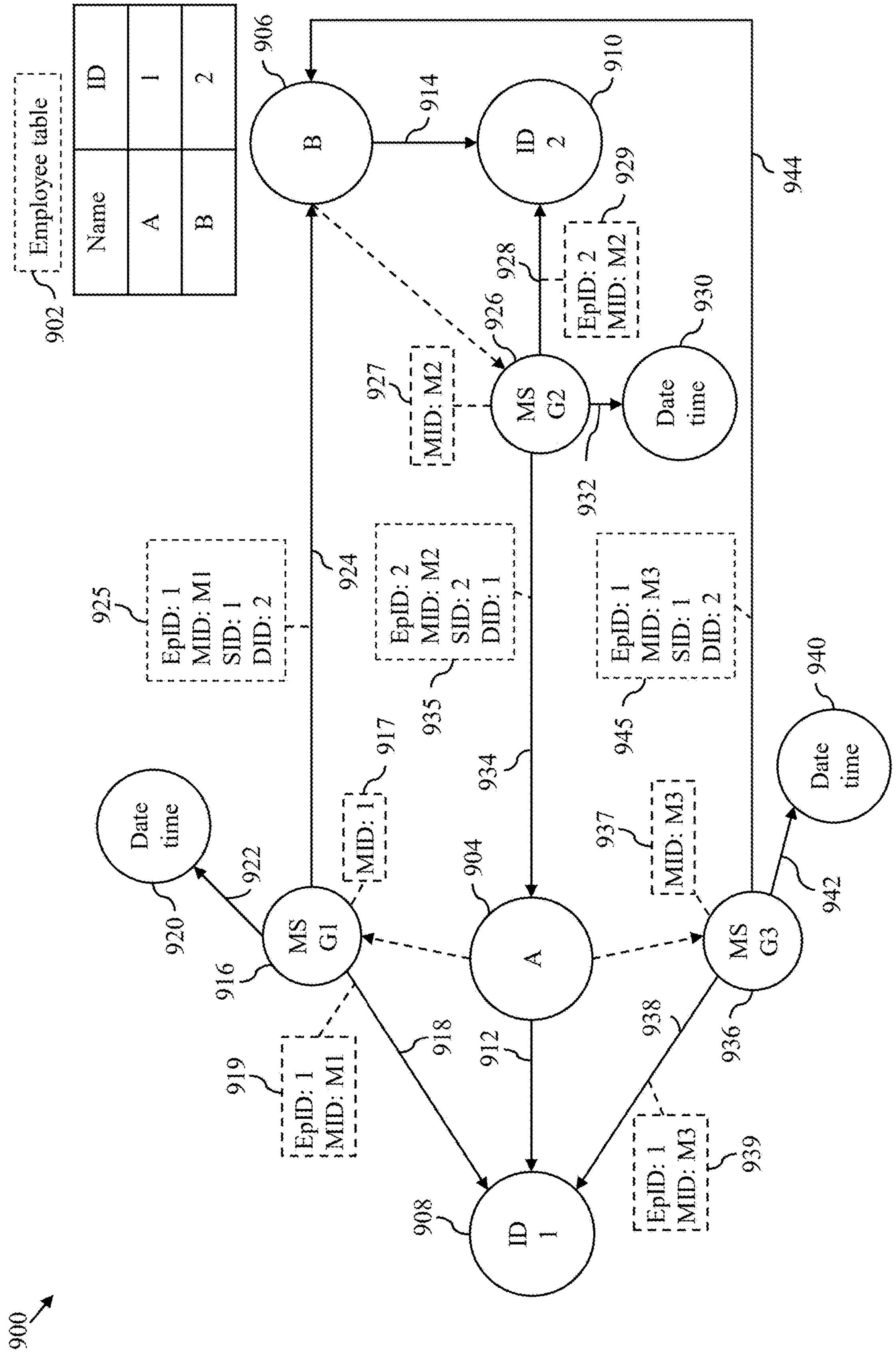
FIG. 9 is a schematic diagram that illustrates an example implementation of message management in a graph, consistent with disclosed embodiments of the present disclosure.

FIG. 9 is a schematic diagram that illustrates an example implementation of message management in a graph 900, consistent with disclosed embodiments of the present disclosure. Referring to FIG. 9, the graph 900 may be derived from an employee table 902 and showcases communication between two employees that may be associated with an organization. These employees may be working on a project that requires ongoing communication between them. The table 902 is shown to include two columns: name and ID. The name column stores the names of the employees associated with the organization, for example, employee A and employee B. The ID column stores unique IDs of the employees, for example, ID '1' for employee A and ID '2' for employee B.

The employee A is represented as an employee node 904 and the employee B is represented as an employee node 906. Further, an attribute node 908 may represent the ID of employee A, and an attribute node 910 may represent the ID of employee B. The employee node 904 is associated with the attribute node 908 by way of an edge 912. Although not shown, the edge 912 has edge properties associated therewith. The edge properties may be in the form of key-value pairs such as name: 'A' and ID: '1'. Similarly, the employee node 906 is associated with the attribute node 910 by way of an edge 914. The edge properties of the edge 914 may include key-value pairs such as name: 'B' and employee ID: '2'.

The project may be initiated by the employee A. Upon execution of a certain portion of the project, the employee A may communicate with the employee B for further execution of the project. In such a scenario, the employee A may send a first message to the employee B. The first message is represented by a message node 916. The first message is associated with an ID 'M1'. The message node 916 is shown to be associated with a dotted box 917 that may represent node properties thereof. As shown, the dotted box 917 may include the ID of the first message, i.e., message ID: 'M1'. The association between the employee node 904 and the message node 916 is shown by a dotted arrow.

The first message is created by the employee A. Therefore, the ID of the employee A may correspond to a source ID of the first message. An edge 918 is shown to couple the message node 916 with the attribute node 908 i.e., the ID of the employee A. The edge 918 is shown to be associated with a dotted box 919 that may include edge properties in the form of key-value pairs such as employee ID: '1' and message ID: 'M1'. Further, the message node 916 is shown to be associated with an attribute node 920 that may represent a creation timestamp of the first message. The message node 916 is shown to be coupled to the attribute node 920 by way of an edge 922. Although not shown, the edge 922 may have edge properties associated therewith.

The first message may include the ID of the employee B, and hence, may be directly communicated to employee B. The message node 916 is shown to be associated with the employee node 906 by way of an edge 924. The edge 924 is shown to be associated with a dotted box 925 that may include edge properties of the edge 924. As shown, the dotted box 925 may include the employee ID associated with the first message, i.e., employee ID: '1', message ID of the first message, i.e., message ID: 'M1', source ID of the first message, i.e., source ID: '1' and destination ID of the first message, i.e., employee ID: '2'.

Further, the first message may be processed by the employee B. In response to the processing of the first message, the employee B may generate a second message. Further, the employee B may send the second message to the employee A. The second message is represented as a message node 926. The second message is associated with an ID 'M2'. The message node 926 is shown to be associated with a dotted box 927 that may include properties of the second message. As shown, the dotted box 927 may include the ID of the second message, i.e., message ID: 'M2'. The association between the employee node 906 and the message node 926 is shown by a dotted arrow.

The second message is created by the employee B. Therefore, the ID of the employee B may correspond to a source ID of the second message. An edge 928 is shown to couple the message node 926 with the attribute node 910. The edge 928 is shown to be associated with a dotted box 929, which may include edge properties in the form of key-value pairs such as employee ID: '2' and message ID: 'M2'. Further, the message node 926 is shown to be associated with an attribute node 930 that may comprise a raised timestamp of the second message. The message node 926 is shown to be coupled to the attribute node 930 by way of an edge 932. Although not shown, the edge 932 may be associated with edge properties.

The second message may include the ID of the employee A, and hence, may be directly communicated to employee A. The message node 926 is shown to be associated with the employee node 904 by way of an edge 934. The edge 934 is shown to be associated with a dotted box 935 that may include edge properties of the edge 934. As shown, the dotted box 935 may include the employee ID associated with the second message, i.e., employee ID: '2', message ID of the second message, i.e., message ID: 'M2', source ID of the second message, i.e., source ID: '2' and destination ID of the second message, i.e., employee ID: '1'.

Upon reception of the second message, the employee A may generate an acknowledgment message of the successful reception of the second message. Further, the employee A may send the acknowledgment message to the employee B. The acknowledgment message may correspond to a third message. The third message is represented as a message node 936. The third message is associated with an ID 'M3'. The message node 936 is shown to be associated with a dotted box 937 that may include properties of the third message. As shown, the dotted box 937 may include the ID of the third message, i.e., message ID: 'M3'. The association between the employee node 904 and the message node 936 is shown by a dotted arrow.

The third message is created by the employee A. Therefore, the ID of the employee A may correspond to a source ID of the third message. An edge 938 is shown to couple the message node 936 with the attribute node 908. The edge 938 is shown to be associated with a dotted box 939, which may include edge properties in the form of key-value pairs such as employee ID: '1' and message ID: 'M3'. Further, the message node 936 is shown to be associated with an attribute node 940 that may comprise a received timestamp of the third message. The message node 936 is shown to be coupled to the attribute node 940 by way of an edge 942. Although not shown, the edge 942 may be associated with edge properties.

The third message may include the ID of the employee B, and hence, may be directly communicated to employee B. The message node 936 is shown to be associated with the employee node 906 by way of an edge 944. The edge 944 is shown to be associated with a dotted box 935 that may include edge properties of the edge 944. As shown, the dotted box 945 may include the employee ID associated with the third message, i.e., employee ID: '1', message ID of the third message, i.e., message ID: 'M3', source ID of the third message, i.e., source ID: '1' and destination ID of the third message, i.e., employee ID: '2'.

The aforementioned architecture may be utilized to derive various analytical insights, such as the total number of messages communicated by the employees A and B, the highest number of messages being sent by an employee, at which end of communication a message may have been lost, or the like. Such analytical insights are crucial in different domains that facilitate real-time or near real-time exchange of information by way of messages. For example, to analyze the total number of messages communicated by the employee A having employee ID '1', the processing circuitry 104 may be configured to determine the attribute node 908 associated with the employee A. Upon identification of the attribute node 908, the processing circuitry 104 may identify that edges 918 and 938 are associated with the attribute node 908. Further, from the edge properties of the corresponding edges, the processing circuitry 104 may be configured to identify that the message node 916 and the message node 936 are created and further communicated by the employee A. Therefore, in this scenario, the processing circuitry 104 may return a count of '2' as the total number of messages being communicated by the employee A. Designing the ID as the attribute node allows efficient identification of all the messages communicated by a specific user. The solution of the present disclosure thus ensures optimized query processing with reduced memory utilization.

Figure 10:
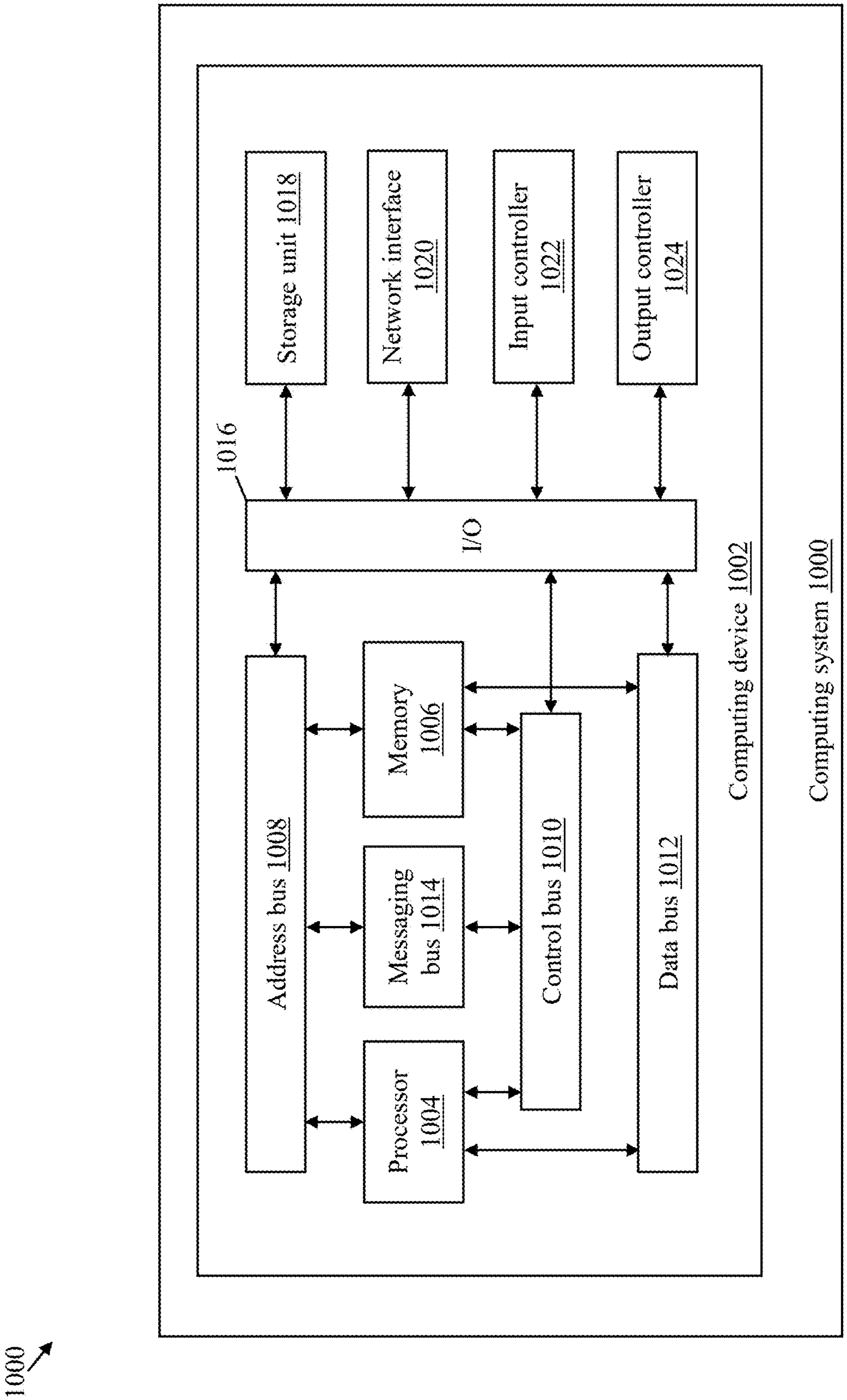
FIG. 10 illustrates an example computing system for carrying out the methods of the present disclosure, consistent with disclosed embodiments of the present disclosure.

FIG. 10 illustrates an example computing system 1000 for carrying out the methods of the present disclosure, consistent with disclosed embodiments of the present disclosure. Specifically, FIG. 10 shows a block diagram of an embodiment of the computing system 1000 according to example embodiments of the present disclosure.

The computing system 1000 may be configured to perform any of the operations disclosed herein. The computing system 1000 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 1000 is a distributed system configured to function using multiple computing machines interconnected via a data network or bus system.

The computing system 1000 includes computing devices (such as a computing device 1002). The computing device 1002 includes one or more processors (such as a processor 1004) and a memory 1006. The processor 1004 may be any general-purpose processor(s) configured to execute a set of instructions. For example, the processor 1004 may be a processor core, a multiprocessor, a reconfigurable processor, a microcontroller, a digital signal processor (DSP), an application-specific integrated circuit (ASIC), a graphics processing unit (GPU), a neural processing unit (NPU), an accelerated processing unit (APU), a brain processing unit (BPU), a data processing unit (DPU), a holographic processing unit (HPU), an intelligent processing unit (IPU), a microprocessor/microcontroller unit (MPU/MCU), a radio processing unit (RPU), a tensor processing unit (TPU), a vector processing unit (VPU), a wearable processing unit (WPU), a field programmable gate array (FPGA), a programmable logic device (PLD), a controller, a state machine, gated logic, discrete hardware component, any other processing unit, or any combination or multiplicity thereof. In one embodiment, the processor 1004 may be multiple processing units, a single processing core, multiple processing cores, special purpose processing cores, co-processors, or any combination thereof. The processor 1004 may be communicatively coupled to the memory 1006 via an address bus 1008, a control bus 1010, a data bus 1012, and a messaging bus 1014.

The memory 1006 may include non-volatile memories such as a read-only memory (ROM), a programable read-only memory (PROM), an erasable programmable read-only memory (EPROM), a flash memory, or any other device capable of storing program instructions or data with or without applied power. The memory 1006 may also include volatile memories, such as a random-access memory (RAM), a static random-access memory (SRAM), a dynamic random-access memory (DRAM), and a synchronous dynamic random-access memory (SDRAM). The memory 1006 may include single or multiple memory modules. While the memory 1006 is depicted as part of the computing device 1002, a person skilled in the art will recognize that the memory 1006 can be separate from the computing device 1002.

The memory 1006 may store information that can be accessed by the processor 1004. For instance, the memory 1006 (e.g., one or more non-transitory computer-readable storage mediums, memory devices) may include computer-readable instructions (not shown) that can be executed by the processor 1004. The computer-readable instructions may be software written in any suitable programming language or may be implemented in hardware. Additionally, or alternatively, the computer-readable instructions may be executed in logically and/or virtually separate threads on the processor 1004. For example, the memory 1006 may store instructions (not shown) that when executed by the processor 1004 cause the processor 1004 to perform operations such as any of the operations and functions for which the computing system 1000 is configured, as described herein. Additionally, or alternatively, the memory 1006 may store data (not shown) that can be obtained, received, accessed, written, manipulated, created, and/or stored. The data can include, for instance, the data and/or information described herein in relation to FIGS. 1-9. In some implementations, the computing device 1002 may obtain from and/or store data in one or more memory device(s) that are remote from the computing system 1000.

The computing device 1002 may further include an input/output (I/O) interface 1016 communicatively coupled to the address bus 1008, the control bus 1010, and the data bus 1012. The data bus 1012 and messaging bus 1014 may include a plurality of tunnels that may support parallel processing of messages. The I/O interface 1016 is configured to couple to one or more external devices (e.g., to receive and send data from/to one or more external devices). Such external devices, along with the various internal devices, may also be known as peripheral devices. The I/O interface 1016 may include both electrical and physical connections for operably coupling the various peripheral devices to the computing device 1002. The I/O interface 1016 may be configured to communicate data, addresses, and control signals between the peripheral devices and the computing device 1002. The I/O interface 1016 may be configured to implement any standard interface, such as a small computer system interface (SCSI), a serial-attached SCSI (SAS), a fiber channel, a peripheral component interconnect (PCI), a PCI express (PCIe), a serial bus, a parallel bus, an advanced technology attachment (ATA), a serial ATA (SATA), a universal serial bus (USB), Thunderbolt, FireWire, various video buses, or the like. The I/O interface 1016 is configured to implement only one interface or bus technology. Alternatively, the I/O interface 1016 is configured to implement multiple interfaces or bus technologies. The I/O interface 1016 may include one or more buffers for buffering transmissions between one or more external devices, internal devices, the computing device 1002, or the processor 1004. The I/O interface 1016 may couple the computing device 1002 to various input devices, including mice, touch screens, scanners, biometric readers, electronic digitizers, sensors, receivers, touchpads, trackballs, cameras, microphones, keyboards, any other pointing devices, or any combinations thereof. The I/O interface 1016 may couple the computing device 1002 to various output devices, including video displays, speakers, printers, projectors, tactile feedback devices, automation control, robotic components, actuators, motors, fans, solenoids, valves, pumps, transmitters, signal emitters, lights, and so forth.

The computing system 1000 may further include a storage unit 1018, a network interface 1020, an input controller 1022, and an output controller 1024. The storage unit 1018, the network interface 1020, the input controller 1022, and the output controller 1024 are communicatively coupled to the central control unit (e.g., the memory 1006, the address bus 1008, the control bus 1010, and the data bus 1012) via the I/O interface 1016. The network interface 1020 communicatively couples the computing system 1000 to one or more networks such as wide area networks (WAN), local area networks (LAN), intranets, the Internet, wireless access networks, wired networks, mobile networks, telephone networks, optical networks, or combinations thereof. The network interface 1020 may facilitate communication with packet-switched networks or circuit-switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

The storage unit 1018 is a computer-readable medium, preferably a non-transitory computer-readable medium, comprising one or more programs, the one or more programs comprising instructions which when executed by the processor 1004 cause the computing system 1000 to perform the method steps of the present disclosure. Alternatively, the storage unit 1018 is a transitory computer-readable medium. The storage unit 1018 can include a hard disk, a floppy disk, a compact disc read-only memory (CD-ROM), a digital versatile disc (DVD), a Blu-ray disc, a magnetic tape, a flash memory, another non-volatile memory device, a solid-state drive (SSD), any magnetic storage device, any optical storage device, any electrical storage device, any semiconductor storage device, any physical-based storage device, any other data storage device, or any combination or multiplicity thereof. In one embodiment, the storage unit 1018 stores one or more operating systems, application programs, program modules, data, or any other information. The storage unit 1018 is part of the computing device 1002. Alternatively, the storage unit 1018 is part of one or more other computing machines that are in communication with the computing device 1002, such as servers, database servers, cloud storage, network attached storage, and so forth.

The input controller 1022 may include suitable logic, circuitry, interfaces, and/or code, executable by the circuitry, that may be configured to control one or more input devices that may be configured to receive an input (e.g., the query) generated by the real-time system 102. The output controller 1024 may include suitable logic, circuitry, interfaces, and/or code, executable by the circuitry, that may be configured to control one or more output devices that may be configured to render/output the outcome of the operation executed to process the received input.

Figure 11A:
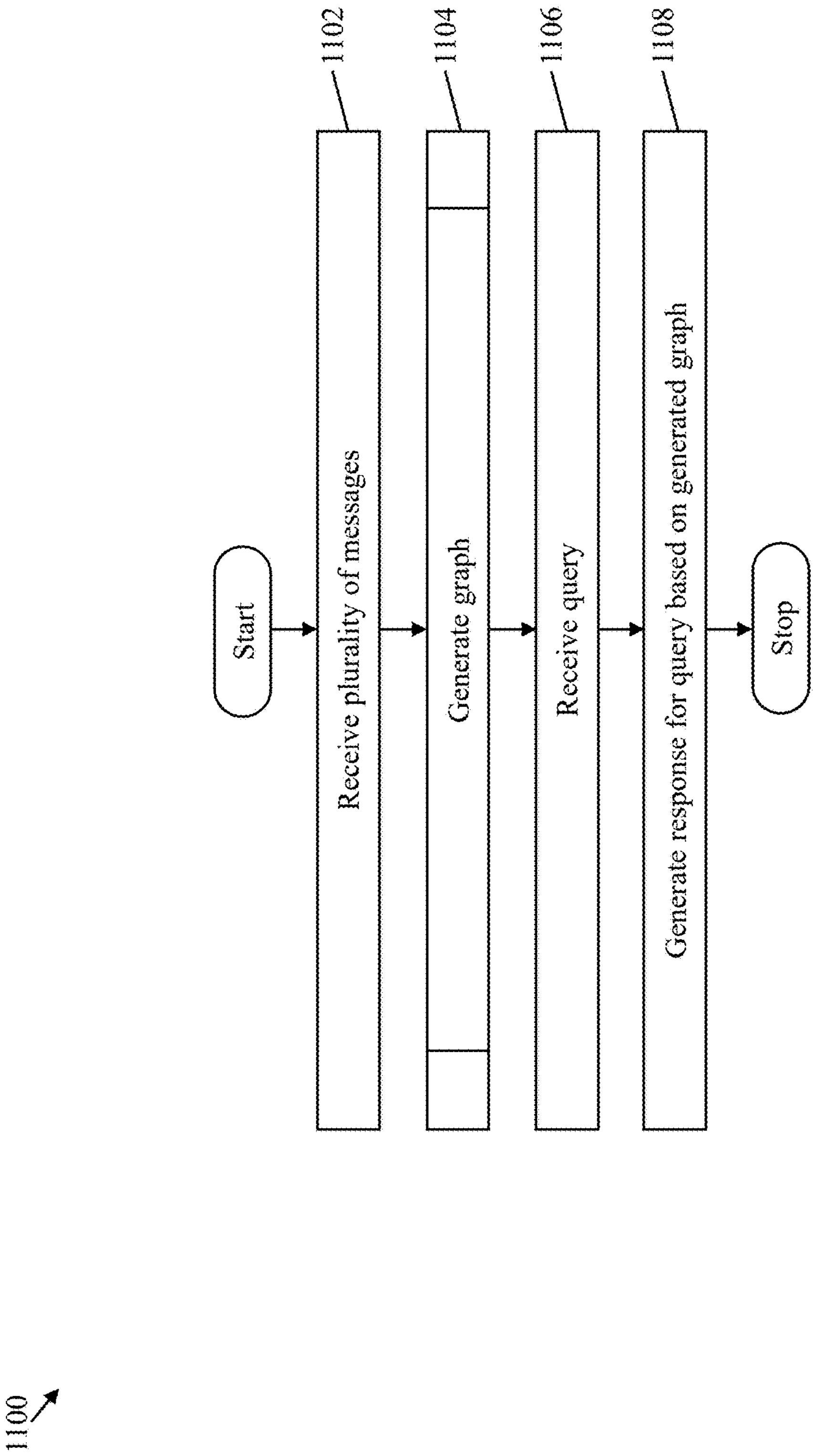
FIGS. 11A and 11B collectively, represents a flowchart that illustrates a method for facilitating message management using directed property graphs, consistent with disclosed embodiments of the present disclosure.
Figure 11B:
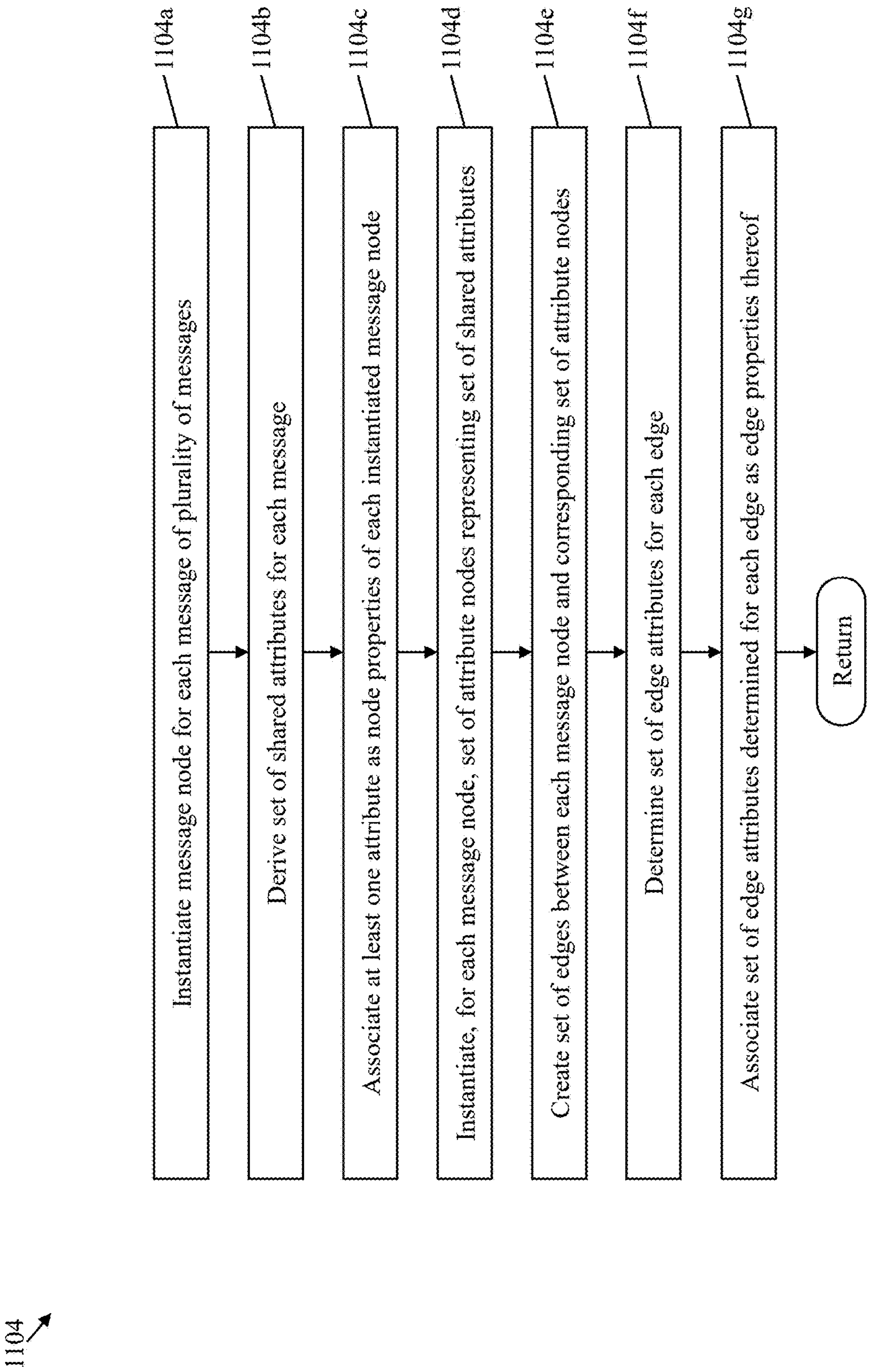

FIGS. 11A and 11B collectively, represents a flowchart 1100 that illustrates a method for facilitating message management using directed property graphs, consistent with disclosed embodiments of the present disclosure.

Referring to FIG. 11A, at 1102, the processing circuitry 104 may receive a plurality of messages. Each message may be generated within the real-time system 102. At 1104, the processing circuitry 104 may generate a graph (e.g., the directed property graph 110). The generation of the graph is explained in conjunction with FIG. 11B.

Referring to FIG. 11B, to generate the graph, at 1104*a*, the processing circuitry 104 may instantiate a message node for each message of the plurality of messages. At 1104*b*, the processing circuitry 104 may derive a set of shared attributes for each message. At 1104*c*, the processing circuitry 104 may associate at least one attribute as node properties of each instantiated message node. At 1104*d*, the processing circuitry 104 may instantiate, for each message node, a set of attribute nodes representing the set of shared attributes. At 1104*e*, the processing circuitry 104 may create a set of edges between each message node and corresponding set of attribute nodes. At 1104*f*, the processing circuitry 104 may determine a set of edge attributes for each edge. At 1104*g*, the processing circuitry 104 may associate the set of edge attributes determined for each edge as edge properties thereof.

Referring back to FIG. 11A, at 1106, the processing circuitry 104 may receive a query. The query may be generated by the real-time system 102. At 1108, the processing circuitry 104 may generate a response for the query based on the generated graph.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however, some of the operations may be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the present disclosure provide, among other features, systems and methods for message management using directed property graphs. While various embodiments of the disclosed systems and methods have been described above, it should be understood that they have been presented for purposes of example only, and not limitations. It is not exhaustive and does not limit the present disclosure to the precise form disclosed. Modifications and variations are possible in light of the above teachings or may be acquired from practicing the present disclosure, without departing from the breadth or scope.

Moreover, for example, the present technology/system may achieve the following configurations:

1. A system, comprising:
   processing circuitry configured to generate a graph based on a plurality of messages,
   wherein to generate the graph, the processing circuitry is further configured to:
   instantiate a first message node that represents a first message of the plurality of messages, wherein the first message has a first plurality of attributes associated therewith;
   derive, from the first plurality of attributes, a first set of shared attributes;
   instantiate a first set of attribute nodes that represents the first set of shared attributes;
   create a set of edges between the first message node and the first set of attribute nodes, with a first edge being created between the first message node and a first attribute node;
   determine, for the first edge, based on the first plurality of attributes, a first set of edge attributes that is indicative of an association between the first message node and the first attribute node; and
   associate the first set of edge attributes as edge properties of the first edge, and wherein the generated graph facilitates query response generation.
2. The system of 1, further comprising a storage element, wherein the processing circuitry is coupled to the storage element, and configured to store the graph in the storage element.
3. The system of 1, wherein the first plurality of attributes comprises at least two of a group consisting of an identifier, a correlation identifier, a user identifier, a name, a category, a topic, a key, a scope, an access, a status, an execution, an action, a message type, a created-on timestamp, a raised-on timestamp, a received-on timestamp, a handled-on timestamp, a processed-on timestamp, a publisher identifier, a subscriber identifier, an allow retry, a maximum retry allowed, a retry count, a retry source identifier, a source identifier, or a source type.
4. The system of 1, wherein each of the first set of shared attributes is shared with at least one other message of the plurality of messages.
5. The system of 1, wherein the first set of shared attributes comprises at least one of a group consisting of an identifier, a correlation identifier, a user identifier, a created-on timestamp, a raised-on timestamp, a received-on timestamp, a handled-on timestamp, or a processed-on timestamp.
6. The system of 1, wherein the processing circuitry is further configured to associate at least one of the first plurality of attributes as node properties of the first message node.
7. The system of 6, wherein at least one of a group consisting of an identifier, a name, a category, a topic, a key, a scope, an access, a status, an execution, an action, a message type, a created-on timestamp, a raised-on timestamp, a received-on timestamp, a handled-on timestamp, a processed-on timestamp, a publisher identifier, a subscriber identifier, an allow retry, a maximum retry allowed, a retry count, a retry source identifier, a source identifier, or a source type is associated as the node properties of the first message node.
8. The system of 1, wherein the processing circuitry is further configured to:

determine, based on the first plurality of attributes, a set of attributes for the first attribute node, wherein the set of attributes is linked with a shared attribute, of the first set of shared attributes, represented by the first attribute node; and associate the determined set of attributes as node properties of the first attribute node.

9. The system of 8, wherein the first set of edge attributes of the first edge comprises (i) at least one attribute associated as node properties of the first message node and (ii) at least one of the determined set of attributes.

10. The system of 1, wherein to generate the graph, the processing circuitry is further configured to instantiate a second message node that represents a second message of the plurality of messages, wherein the second message has a second plurality of attributes associated therewith, and wherein a response to a query is generated based on at least one of a group consisting of the first message node, node properties of the first message node, the first set of attribute nodes, the set of edges, the edge properties of the first edge, the second message node, or node properties of the second message node.

11. The system of 10, wherein the processing circuitry is further configured to associate (i) at least one of the first plurality of attributes as the node properties of the first message node and (ii) at least one of the second plurality of attributes as the node properties of the second message node.

12. The system of 10, wherein to generate the graph, the processing circuitry is further configured to:

create a second edge between the second message node and the first message node;

determine, for the second edge, a second set of edge attributes that is indicative of an association between the second message node and the first message node; and associate the second set of edge attributes as edge properties of the second edge.

13. The system of 12, wherein the first message is correlated with the second message such that the first message has a causal association with the second message, and as a result, the first message node representing the first message has a causal association with the second message node representing the second message, and wherein the second edge is indicative of the causal association between the second message node and the first message node.

14. The system of 12, wherein the second set of edge attributes comprises (i) at least one attribute associated as the node properties of the first message node and (ii) at least one attribute associated as the node properties of the second message node.

15. The system of 12, wherein the response is generated further based on at least one of a group consisting of the second edge and the edge properties of the second edge.

16. The system of 10, wherein to generate the graph, the processing circuitry is further configured to:

create a third edge between the second message node and the first attribute node;

determine, for the third edge, a third set of edge attributes that is indicative of an association between the second message node and the first attribute node; and associate the third set of edge attributes as edge properties of the third edge.

17. The system of 16, wherein the processing circuitry is further configured to determine, based on the first plurality of attributes, a set of attributes for the first attribute node, and associate the determined set of attributes as node properties of the first attribute node, wherein the determined set of attributes is linked with a shared attribute, of the first set of shared attributes, represented by the first attribute node, and wherein the third set of edge attributes comprises (i) at least one of the determined set of attributes and (ii) at least one attribute associated as the node properties of the second message node.

18. The system of 16, wherein the response is generated further based on at least one of a group consisting of the determined set of attributes, the third edge, or the edge properties of the third edge.

19. The system of 10, wherein to generate the graph, the processing circuitry is further configured to:

derive, from the second plurality of attributes, a second set of shared attributes;

instantiate a second set of attribute nodes that represents the second set of shared attributes;

create a fourth edge between the first attribute node and a second attribute node of the second set of attribute nodes;

determine, for the fourth edge, a fourth set of edge attributes that is indicative of an association between the first attribute node and the second attribute node; and associate the fourth set of edge attributes as edge properties of the fourth edge.

20. The system of 19, wherein the processing circuitry is further configured to determine, based on the first plurality of attributes, a first set of attributes for the first attribute node and associate the first set of attributes as node properties of the first attribute node, wherein the processing circuitry is further configured to determine, based on the second plurality of attributes, a second set of attributes for the second attribute node and associate the second set of attributes as node properties of the second attribute node, wherein the first set of attributes is linked with a first shared attribute, of the first set of shared attributes, represented by the first attribute node, and the second set of attributes is linked with a second shared attribute, of the second set of shared attributes, represented by the second attribute node, and wherein the fourth set of edge attributes comprises (i) at least one of the first set of attributes and (ii) at least one of the second set of attributes.

21. The system of 19, wherein the response is generated further based on at least one of a group consisting of the second set of attribute nodes, the fourth edge, or the edge properties of the fourth edge.

22. The system of 10, wherein the second message is generated based on a processing of the first message.

23. The system of 1, wherein to generate the graph, the processing circuitry is further to:

instantiate a first entity node associated with the first message node;

create a fifth edge between the first message node and the first entity node;

determine, for the fifth edge, a fifth set of edge attributes that is indicative of an association between the first message node and the first entity node; and associate the fifth set of edge attributes as edge properties of the fifth edge.

24. The system of 23, wherein the processing circuitry is further configured to determine a set of entity attributes for the first entity node and associate the set of entity attributes as node properties of the first entity node, and wherein the fifth set of edge attributes comprises (i) at least one of the set of entity attributes and (ii) at least one attribute associated as node properties of the first message node.

25. The system of 23, wherein a response to a query is generated based on at least one of a group consisting of the first entity node, the fifth edge, or the edge properties of the fifth edge.

26. The system of 23, wherein to generate the graph, the processing circuitry is further configured to:
instantiate a second message node that represents a second message of the plurality of messages;
instantiate a second entity node associated with the second message node;
create a sixth edge between the second message node and the second entity node;
determine, for the sixth edge, a sixth set of edge attributes that is indicative of an association between the second message node and the second entity node;
associate the sixth set of edge attributes as edge properties of the sixth edge;
create a seventh edge between the second entity node and the first entity node;
determine, for the seventh edge, a seventh set of edge attributes that is indicative of an association between the second entity node and the first entity node; and
associate the seventh set of edge attributes as edge properties of the seventh edge.

27. The system of 26, wherein the processing circuitry is further configured to determine a first set of entity attributes for the first entity node and a second set of entity attributes for the second entity node, and associate the first set of entity attributes as node properties of the first entity node and the second set of entity attributes as node properties of the second entity node, wherein the sixth set of edge attributes comprises (i) at least one of the second set of entity attributes and (ii) at least one attribute associated as node properties of the second message node, and wherein the seventh set of edge attributes comprises (i) at least one of the first set of entity attributes and (ii) at least one of the second set of entity attributes.

28. The system of 26, wherein a response to a query is generated based on at least one of a group consisting of the second message node, the second entity node, the sixth edge, the edge properties of the sixth edge, the seventh edge, or the edge properties of the seventh edge.

29. The system of 26, wherein the second entity node corresponds to a next version of the first entity node.

30. The system of 23, wherein to generate the graph, the processing circuitry is further configured to:
instantiate a second message node that represents a second message of the plurality of messages;
create an eighth edge between the second message node and the first entity node;
determine, for the eighth edge, an eighth set of edge attributes that is indicative of an association between the second message node and the first entity node, wherein the eighth set of edge attributes comprises (i) at least one attribute associated as node properties of the second message node and (ii) at least one of a set of entity attributes of the first entity node; and
associate the eighth set of edge attributes as edge properties of the eighth edge.

31. The system of 23, wherein to generate the graph, the processing circuitry is further configured to:
create a ninth edge between the first entity node and the first attribute node;
determine, for the ninth edge, a ninth set of edge attributes that is indicative of an association between the first entity node and the first attribute node; and
associate the ninth set of edge attributes as edge properties of the ninth edge.

32. The system of 31, wherein the processing circuitry is further configured to determine a set of entity attributes for the first entity node and associate the set of entity attributes as node properties of the first entity node, wherein the processing circuitry is further configured to determine a set of attributes for the first attribute node and associate the set of attributes as node properties of the first attribute node, and wherein the ninth set of edge attributes comprises (i) at least one of the set of entity attributes and (ii) at least one of the set of attributes of the first attribute node.

33. The system of 31, wherein a response to a query is generated based on at least one of a group consisting of the ninth edge or the edge properties of the ninth edge.

34. The system of 1, wherein the first message corresponds to at least one of a group consisting of a command, a query, and an event.

35. The system of 1, wherein the first edge couples the first message node to the first attribute node by way of an out-role and an in-role, with the out-role defining an origin of the corresponding edge and the in-role defining a destination of the corresponding edge.

36. The system of 1, wherein the processing circuitry is further configured to:
receive a query that comprises a reference value;
identify, in the graph, at least one attribute node having a data value that is associated with the reference value;
identify one or more edges associated with the identified attribute node; and
generate a response to the query based on the identified attribute node and the identified one or more edges.

37. The system of 36, wherein the processing circuitry is further configured to identify one or more nodes linked to the identified one or more edges, respectively, wherein an identified node, of the identified one or more nodes, corresponds to one of a group consisting of a message node and an attribute node, and wherein the response is generated further based on the identified one or more nodes.

38. The system of 1, wherein the processing circuitry is further configured to:
receive a query that comprises a reference value;
identify, in the graph, at least one edge having an edge property that is associated with the reference value; and
generate a response to the query based on the identified at least one edge.

39. The system of 1, wherein the graph corresponds to a directed property graph.

40. A method, comprising:
generating, by processing circuitry, a graph based on a plurality of messages,
wherein the step of generating the graph further comprises:
instantiating, by the processing circuitry, a first message node that represents a first message of the plurality of messages, wherein the first message has a first plurality of attributes associated therewith;

deriving, by the processing circuitry, from the first plurality of attributes, a first set of shared attributes;

instantiating, by the processing circuitry, a first set of attribute nodes that represents the first set of shared attributes;

creating, by the processing circuitry, a set of edges between the first message node and the first set of attribute nodes, with a first edge being created between the first message node and a first attribute node;

determining, by the processing circuitry, for the first edge, from the first plurality of attributes, a first set of edge attributes that is indicative of an association between the first message node and the first attribute node; and associating, by the processing circuitry, the first set of edge attributes as edge properties of the first edge, and wherein the generated graph facilitates query response generation.

What is claimed is:

1. A system, comprising:

processing circuitry configured to generate a graph based on a plurality of messages, wherein to generate the graph, the processing circuitry is further configured to:

instantiate a first message node that represents a first message of the plurality of messages, wherein the first message has a first plurality of attributes associated therewith;

derive, from the first plurality of attributes, a first set of shared attributes;

instantiate a first set of attribute nodes that represents the first set of shared attributes;

create a set of edges between the first message node and the first set of attribute nodes, with a first edge being created between the first message node and a first attribute node of the first set of attribute nodes;

determine, for the first edge, from the first plurality of attributes, a first set of edge attributes that is indicative of an association between the first message node and the first attribute node, wherein the first set of edge attributes is determined from the first plurality of attributes based on an association between the first message and a shared attribute of the first set of shared attributes, the shared attribute represented by the first attribute node; and associate the first set of edge attributes as edge properties of the first edge, and wherein the generated graph facilitates query response generation.

2. The system of claim 1, wherein each of the first set of shared attributes is shared with at least one other message of the plurality of messages.

3. The system of claim 1, wherein the first set of shared attributes comprises at least one of a group consisting of an identifier, a correlation identifier, a user identifier, a created-on timestamp, a raised-on timestamp, a received-on timestamp, a handled-on timestamp, or a processed-on timestamp.

4. The system of claim 1, wherein the processing circuitry is further configured to associate at least one of the first plurality of attributes as node properties of the first message node.

5. The system of claim 1, wherein the processing circuitry is further configured to:

determine, based on the first plurality of attributes, a set of attributes for the first attribute node, wherein the set of attributes is linked with the shared attribute of the first set of shared attributes; and associate the determined set of attributes as node properties of the first attribute node.

6. The system of claim 5, wherein the first set of edge attributes of the first edge comprises (i) at least one attribute associated as node properties of the first message node and (ii) at least one of the determined set of attributes.

7. The system of claim 1, wherein to generate the graph, the processing circuitry is further configured to instantiate a second message node that represents a second message of the plurality of messages, wherein the second message has a second plurality of attributes associated therewith, and wherein a response to a query is generated based on at least one of a group consisting of the first message node, node properties of the first message node, the first set of attribute nodes, the set of edges, the edge properties of the first edge, the second message node, or node properties of the second message node.

8. The system of claim 7, wherein to generate the graph, the processing circuitry is further configured to:

create a second edge between the second message node and the first message node;

determine, for the second edge, a second set of edge attributes that is indicative of an association between the second message node and the first message node; and associate the second set of edge attributes as edge properties of the second edge.

9. The system of claim 8, wherein the second set of edge attributes comprises (i) at least one attribute associated as the node properties of the first message node and (ii) at least one attribute associated as the node properties of the second message node.

10. The system of claim 8, wherein the response is generated further based on at least one of a group consisting of the second edge and the edge properties of the second edge.

11. The system of claim 7, wherein to generate the graph, the processing circuitry is further configured to:

create a third edge between the second message node and the first attribute node;

determine, for the third edge, a third set of edge attributes that is indicative of an association between the second message node and the first attribute node; and associate the third set of edge attributes as edge properties of the third edge.

12. The system of claim 11, wherein the processing circuitry is further configured to determine, based on the first plurality of attributes, a set of attributes for the first attribute node, and associate the determined set of attributes as node properties of the first attribute node, wherein the determined set of attributes is linked with the shared attribute of the first set of shared attributes, and wherein the third set of edge attributes comprises (i) at least one of the determined set of attributes and (ii) at least one attribute associated as the node properties of the second message node.

13. The system of claim 11, wherein the response is generated further based on at least one of a group consisting of the determined set of attributes, the third edge, or the edge properties of the third edge.

14. The system of claim 7, wherein to generate the graph, the processing circuitry is further configured to:

derive, from the second plurality of attributes, a second set of shared attributes;

instantiate a second set of attribute nodes that represents the second set of shared attributes;

create a fourth edge between the first attribute node and a second attribute node of the second set of attribute nodes;

determine, for the fourth edge, a fourth set of edge attributes that is indicative of an association between the first attribute node and the second attribute node; and associate the fourth set of edge attributes as edge properties of the fourth edge.

15. The system of claim 14, wherein the processing circuitry is further configured to determine, based on the first plurality of attributes, a first set of attributes for the first attribute node and associate the first set of attributes as node properties of the first attribute node, wherein the processing circuitry is further configured to determine, based on the second plurality of attributes, a second set of attributes for the second attribute node and associate the second set of attributes as node properties of the second attribute node, wherein the first set of attributes is linked with a first shared attribute, of the first set of shared attributes, represented by the first attribute node, and the second set of attributes is linked with a second shared attribute, of the second set of shared attributes, represented by the second attribute node, and wherein the fourth set of edge attributes comprises (i) at least one of the first set of attributes and (ii) at least one of the second set of attributes.

16. The system of claim 14, wherein the response is generated further based on at least one of a group consisting of the second set of attribute nodes, the fourth edge, or the edge properties of the fourth edge.

17. The system of claim 1, wherein the processing circuitry is further configured to:

receive a query that comprises a reference value;

identify, in the graph, at least one attribute node having a data value that is associated with the reference value;

identify one or more edges associated with the identified attribute node; and generate a response to the query based on the identified attribute node and the identified one or more edges.

18. The system of claim 17, wherein the processing circuitry is further configured to identify one or more nodes linked to the identified one or more edges, respectively, wherein an identified node, of the identified one or more nodes, corresponds to one of a group consisting of a message node and an attribute node, and wherein the response is generated further based on the identified one or more nodes.

19. The system of claim 1, wherein the processing circuitry is further configured to:

receive a query that comprises a reference value;

identify, in the graph, at least one edge having an edge property that is associated with the reference value; and generate a response to the query based on the identified at least one edge.

20. A method, comprising:

generating, by processing circuitry, a graph based on a plurality of messages, wherein the step of generating the graph further comprises:

instantiating, by the processing circuitry, a first message node that represents a first message of the plurality of messages, wherein the first message has a first plurality of attributes associated therewith;

deriving, by the processing circuitry, from the first plurality of attributes, a first set of shared attributes;

instantiating, by the processing circuitry, a first set of attribute nodes that represents the first set of shared attributes;

creating, by the processing circuitry, a set of edges between the first message node and the first set of attribute nodes, with a first edge being created between the first message node and a first attribute node of the first set of attribute nodes;

determining, by the processing circuitry, for the first edge, from the first plurality of attributes, a first set of edge attributes that is indicative of an association between the first message node and the first attribute node, wherein the first set of edge attributes is determined from the first plurality of attributes based on an association between the first message and a shared attribute of the first set of shared attributes, the shared attribute represented by the first attribute node; and associating, by the processing circuitry, the first set of edge attributes as edge properties of the first edge, and wherein the generated graph facilitates query response generation.

* * * * *